(12) United States Patent
Hu et al.

(10) Patent No.: US 11,443,200 B2
(45) Date of Patent: Sep. 13, 2022

(54) AUTOMATED DECISION ANALYSIS BY MODEL OPERATIONAL CHARACTERISTIC CURVES

(71) Applicant: Visa International Service Association, San Francisco, CA (US)

(72) Inventors: Hung-Tzaw Hu, Saratoga, CA (US); Benjamin Scott Boding, Mountain View, CA (US); Ge Wen, Fremont, CA (US); Haochuan Zhou, Redwood City, CA (US)

(73) Assignee: Visa International Service Association, San Francisco, CA (US)

( * ) Notice: Subject to any disclaimer, the term of this patent is extended or adjusted under 35 U.S.C. 154(b) by 395 days.

(21) Appl. No.: 15/780,453

(22) PCT Filed: Mar. 6, 2018

(86) PCT No.: PCT/US2018/021118
§ 371 (c)(1),
(2) Date: May 31, 2018

(87) PCT Pub. No.: WO2019/172887
PCT Pub. Date: Sep. 12, 2019

(65) Prior Publication Data
US 2020/0175388 A1 Jun. 4, 2020

(51) Int. Cl.
*G06N 5/04* (2006.01)
*G06N 20/00* (2019.01)
(Continued)

(52) U.S. Cl.
CPC ............. *G06N 5/04* (2013.01); *G06N 20/00* (2019.01); *G06Q 10/04* (2013.01); *G06Q 20/4016* (2013.01)

(58) Field of Classification Search
CPC .......... G06N 5/04; G06N 20/00; G06Q 10/04; G06Q 20/4016
See application file for complete search history.

(56) References Cited

U.S. PATENT DOCUMENTS 10,867,303 B1 * 12/2020 Manapat ............. G06Q 10/067
2002/0194119 A1 * 12/2002 Wright ............... G06Q 30/0609
705/38

(Continued)

OTHER PUBLICATIONS

Dheepa, V., and R. Dhanapal. "Behavior based credit card fraud detection using support vector machines." ICTACT Journal on Soft computing 2.4 (2012): 391-397. (Year: 2012).*

*Primary Examiner* — Li B. Zhen
*Assistant Examiner* — Henry Nguyen
(74) *Attorney, Agent, or Firm* — The Webb Law Firm

(57) ABSTRACT

Described are a system, method, and computer program product for optimizing a predictive condition classification model and automatically enacting reactive measures based thereon. The method includes receiving event data representative of a plurality of events. The method also includes receiving the predictive condition classification model configured to categorize each event as satisfying a condition or not. The predictive condition classification model is configured to order the plurality of events by likelihood of satisfying the condition. The method includes generating a performance evaluation dataset and plotting data configured to cause a visual display to represent at least two model performance metrics of the performance evaluation dataset on a same output plot. The method includes automatically rejecting a top percent of the plurality of events for suspected satisfaction of the condition, determined at least partially from a customized rejection algorithm or a preset rejection algorithm.

21 Claims, 7 Drawing Sheets

(51) Int. Cl.
*G06Q 10/04* (2012.01)
*G06Q 20/40* (2012.01)

(56) References Cited

U.S. PATENT DOCUMENTS

| | | | |
|---|---|---|---|
| 2009/0018940 A1* | 1/2009 | Wang | G06Q 40/00 |
| | | | 705/35 |
| 2014/0172576 A1* | 6/2014 | Spears | G06Q 30/0266 |
| | | | 705/14.63 |
| 2015/0371329 A1 | 12/2015 | Davies et al. | |
| 2017/0017760 A1 | 1/2017 | Freese et al. | |
| 2018/0033009 A1 | 2/2018 | Goldman et al. | |
| 2018/0240041 A1* | 8/2018 | Koch | G06N 20/10 |
| 2018/0330268 A1* | 11/2018 | Ben-Or | G06N 7/005 |
| 2019/0188212 A1* | 6/2019 | Miller | G06N 7/005 |

* cited by examiner

AUTOMATED DECISION ANALYSIS BY MODEL OPERATIONAL CHARACTERISTIC CURVES

BACKGROUND OF THE INVENTION

Field of the Invention

Disclosed embodiments relate generally to a system, method, and computer program product for optimizing a decision model and automatically enacting reactive measures based on decision model performance, and in preferred and non-limiting embodiments or aspects, to a system, method, and computer program product for optimizing a predictive fraud detection model and automatically enacting reactive measures based thereon.

Technical Considerations

Across many industries, predictive decision models are employed to categorize data, detect trigger conditions, and optimize computer-implemented methods. A receiver operating characteristic (ROC) curve may be used to illustrate certain aspects of a decision model's performance. ROC curves traditionally display the true positive rate (on the y-axis) against the false positive rate (on the x-axis) at various threshold settings of the decision model. A zero performance predictive model, i.e., a model that has a random chance of correctly detecting a condition, has a linear plot from the origin (0, 0) to point (1, 1). Models with greater than zero performance have a (approximately concave-down) curved plot connecting those same points, and the greater the area beneath the curve, generally speaking, the better the performance of the model. Although a popular method for evaluating model performance, ROC curves are extremely limited in useful feedback. The ROC curve does not indicate for which thresholds of the decision models that each point on the curve was achieved. An ROC curve cannot output an optimal threshold value based on one of the selected true positive rate/false positive rate point pairs without further derivation.

There is a need in the art for an improved representation of the performance of a decision model that allows for the selection of decision thresholds based on model performance metrics. There is further a need in the art for allowing the input of a decision model, outputting an improved representation of model performance, allowing the selection of thresholds from said representation, and implementing actions based on the selected thresholds.

SUMMARY OF THE INVENTION

Accordingly, and generally, provided is an improved system, computer-implemented method, and computer program product for optimizing a predictive condition classification model, including predictive fraud detection models, and automatically enacting reactive measures based thereon. Preferably, provided is a system, computer-implemented method, and computer program product for receiving event data, receiving the predictive condition classification model, generating a performance evaluation dataset and plotting data, and automatically rejecting a top percent of the plurality of events, determined at least partially from a customized rejection algorithm or a preset rejection algorithm.

According to one non-limiting embodiment or aspect, provided is a computer-implemented method for optimizing a predictive condition classification model and automatically enacting reactive measures based thereon. The method includes receiving, with at least one processor, event data representative of a plurality of events, the event data including for each event of the plurality of events, one or more quantitative or categorical parameters. The method also includes receiving, with at least one processor, the predictive condition classification model to be evaluated, the predictive condition classification model configured to categorize each event as satisfying a condition or not based at least partially on the parameters of the event. The predictive condition classification model is further configured to order the plurality of events from most likely satisfying the condition to least likely to satisfy the condition. The method includes generating, with at least one processor, a performance evaluation dataset including an output of the predictive condition classification model given an input of the event data. The method includes generating, with at least one processor, plotting data configured to cause a visual display to represent at least two model performance metrics of the performance evaluation dataset on a same output plot. The same output plot has an x-axis of percentile threshold for condition rejection and a y-axis of percent of metric value. The at least two model performance metrics are calculated from the performance evaluation dataset and include at least one of the following: detection rate, false positive ratio, maximum detectable rate, minimum false positive ratio, model performance score, random model false positive ratio, random model detection rate, or any combination thereof. The method includes automatically rejecting, with at least one processor, a top percent of the plurality of events for suspected satisfaction of the condition, the top percent determined at least partially from: a customized rejection algorithm, in response to receiving an optimization input from a model user, the optimization input including at least one of the following parameters: detect rate requirement; false positive ratio tolerance; rejection rate tolerance; review rate capacity; or any combination thereof; or, a preset rejection algorithm configured to set the top percent to maximize the difference between detect rate and false positive ratio, in response to not receiving the optimization input.

According to one non-limiting embodiment or aspect, provided is a computer-implemented method for optimizing a predictive fraud detection model and automatically enacting reactive measures based thereon. The method includes receiving, with at least one processor, transaction data representative of a plurality of transaction requests between at least one financial device holder and at least one merchant in a first time period. The transaction data includes for each transaction request of the plurality of transaction requests at least one of the following parameters: transaction date, transaction time, transaction value, merchant type, transaction type, merchant location, or any combination thereof. The method also includes receiving, with at least one processor, the predictive fraud detection model to be evaluated. The predictive fraud detection model is configured to categorize each transaction request as fraudulent or legitimate based at least partially on the parameters of the transaction request. The predictive fraud detection model is further configured to order the plurality of transaction requests from most likely fraudulent to least likely fraudulent. The method further includes generating, with at least one processor, a performance evaluation dataset including an output of the predictive fraud detection model given an input of the transaction data. The method further includes generating, with at least one processor, plotting data configured to cause a visual display to represent at least two model performance metrics of the performance evaluation dataset on a same output plot. The same output plot has an x-axis of percentile threshold for transaction rejection and a y-axis of percent of metric value. The at least two model performance metrics are calculated from the performance evaluation dataset and include at least one of the following: detection rate, false positive ratio, maximum detectable rate, minimum false positive ratio, model performance score, random model false positive ratio, random model detection rate, or any combination thereof. The method further includes automatically rejecting, with at least one processor, a top percent of the plurality of transaction requests for suspected fraudulent transaction activity. The top percent is determined at least partially from: a customized rejection algorithm, in response to receiving an optimization input from a model user, the optimization input including at least one of the following parameters: detect rate requirement; false positive ratio tolerance; rejection rate tolerance; review rate capacity; or any combination thereof; or, a preset rejection algorithm configured to set the top percent to maximize the difference between detect rate and false positive ratio, in response to not receiving the optimization input.

In further non-limiting embodiments or aspects, the method may include, in response to receiving a metric input from the model user of a first value of a first selected model performance metric, generating and displaying, with at least one processor, a corresponding value of a second selected model performance metric. The plotting data may be further configured to cause the visual display to represent all of the following model performance metrics on the same output plot: detection rate, false positive ratio, maximum detectable rate, minimum false positive ratio, model performance score, random model false positive ratio, and random model detection rate.

In further non-limiting embodiments or aspects, the method may include receiving, with at least one processor, an extrinsic evaluation of a legitimacy of each transaction request of the top percent of the plurality of transaction requests. The extrinsic evaluation may include a true positive rate and a false positive rate of the performance evaluation dataset. The method may also include adjusting, with at least one processor, the predictive fraud detection model based on the extrinsic evaluation. The method may further include receiving, with at least one processor, a second set of transaction data representative of a plurality of new transaction requests between at least one financial device holder and at least one merchant in a second time period. The method may further include re-generating, with at least one processor, the performance evaluation dataset and re-generating, with at least one processor, the plotting data. The method may further include automatically rejecting, with at least one processor and based on the adjusted predictive fraud detection model, a top percent of the plurality of new transaction requests for suspected fraudulent transaction activity.

In further non-limiting embodiments or aspects, the method may include receiving, with at least one processor, at least one additional predictive fraud detection model to be evaluated. The performance evaluation dataset may further include an output of the at least one additional predictive fraud detection model to be evaluated. The plotting data may be further configured to cause the visual display to represent the predictive fraud detection model comparatively to the at least one additional predictive fraud detection model.

In further non-limiting embodiments or aspects, the method may include receiving, with at least one processor, a selected model from the model user. The selected model may be chosen from a set including the predictive fraud detection model and the at least one additional predictive fraud detection model. The automatic rejection of the top percent of the plurality of transaction requests may be based on the selected model, which may be configured to order the plurality of transaction requests from most likely fraudulent to least likely fraudulent. The top percent may be determined from the customized rejection algorithm. The receiving of the optimization input from the model user may include retrieving, with at least one processor, the optimization input from a database communicatively connected to at least one processor, stored with respect to a saved profile of settings for the model user. The optimization input may be at least partially based on a conversion from an input cost tolerance of the model user. The at least one parameter of the optimization input may be calculated from an associated cost incurred per rejected transaction request.

According to one non-limiting embodiment or aspect, provided is a system for optimizing a predictive fraud detection model and automatically enacting reactive measures based thereon. The system includes at least one server computer including at least one processor. The at least one server computer is programmed and/or configured to receive transaction data representative of a plurality of transaction requests between at least one financial device holder and at least one merchant in a first time period. The transaction data includes for each transaction request of the plurality of transaction requests at least one of the following parameters: transaction date, transaction time, transaction value, merchant type, transaction type, merchant location, or any combination thereof. The at least one server computer is also programmed and/or configured to receive the predictive fraud detection model to be evaluated. The predictive fraud detection model is configured to categorize each transaction request as fraudulent or legitimate based at least partially on the parameters of the transaction request. The predictive fraud detection model is further configured to order the plurality of transaction requests from most likely fraudulent to least likely fraudulent. The at least one server computer is further programmed and/or configured to generate a performance evaluation dataset including an output of the predictive fraud detection model given an input of the transaction data. The at least one server computer is further programmed and/or configured to generate plotting data configured to cause a visual display to represent at least two model performance metrics of the performance evaluation dataset on a same output plot. The same output plot has an x-axis of percentile threshold for transaction rejection and a y-axis of percent of metric value. The at least two model performance metrics are calculated from the performance evaluation dataset and include at least one of the following: detection rate, false positive ratio, maximum detectable rate, minimum false positive ratio, model performance score, random model false positive ratio, random model detection rate, or any combination thereof. The at least one server computer is further programmed and/or configured to automatically reject a top percent of the plurality of transaction requests for suspected fraudulent transaction activity. The top percent is determined at least partially from: a customized rejection algorithm, in response to receiving an optimization input from a model user, the optimization input including at least one of the following parameters: detect rate requirement; false positive ratio tolerance; rejection rate tolerance; review rate capacity; or any combination thereof; or, a preset rejection algorithm configured to set the top percent to maximize the difference between detect rate and false positive ratio, in response to not receiving the optimization input.

In further non-limiting embodiments or aspects, the at least one server computer may be programmed and/or configured to, in response to receiving a metric input from the model user of a first value of a first selected model performance metric, generate and display a corresponding value of a second selected model performance metric. The plotting data may be further configured to cause the visual display to represent all of the following model performance metrics on the same output plot: detection rate, false positive ratio, maximum detectable rate, minimum false positive ratio, model performance score, random model false positive ratio, and random model detection rate.

In further non-limiting embodiments or aspects, the at least one server computer may be programmed and/or configured to receive an extrinsic evaluation of a legitimacy of each transaction request of the top percent of the plurality of transaction requests. The extrinsic evaluation may include a true positive rate and a false positive rate of the performance evaluation dataset. The at least one server computer may also be programmed and/or configured to adjust the predictive fraud detection model based on the extrinsic evaluation. The at least one server computer may further be programmed and/or configured to receive a second set of transaction data representative of a plurality of new transaction requests between at least one financial device holder and at least one merchant in a second time period. The at least one server computer may further be programmed and/or configured to re-generate the performance evaluation dataset and re-generate the plotting data. The at least one server computer may further be programmed and/or configured to automatically reject, based on the adjusted predictive fraud detection model, a top percent of the plurality of new transaction requests for suspected fraudulent transaction activity.

In further non-limiting embodiments or aspects, the at least one server computer may be programmed and/or configured to receive at least one additional predictive fraud detection model to be evaluated. The performance evaluation dataset further may include an output of the at least one additional predictive fraud detection model to be evaluated. The plotting data may be further configured to cause the visual display to represent the predictive fraud detection model comparatively to the at least one additional predictive fraud detection model. The at least one server computer further may be programmed and/or configured to receive a selected model from the model user. The selected model may be chosen from a set including the predictive fraud detection model and the at least one additional predictive fraud detection model. The automatic rejection of the top percent of the plurality of transaction requests may be based on the selected model, which may be configured to order the plurality of transaction requests from most likely fraudulent to least likely fraudulent. The top percent may be determined from the customized rejection algorithm. The receiving of the optimization input from the model user may include retrieving the optimization input from a database communicatively connected to at least one processor, stored with respect to a saved profile of settings for the model user. The optimization input may be at least partially based on a conversion from an input cost tolerance of the model user. The at least one parameter of the optimization input may be calculated from an associated cost incurred per rejected transaction request.

According to one non-limiting embodiment or aspect, provided is a computer program product for optimizing a predictive fraud detection model and automatically enacting reactive measures based thereon. The computer program product includes at least one non-transitory computer-readable medium including program instructions that, when executed by at least one processor, cause the at least one processor to receive transaction data representative of a plurality of transaction requests between at least one financial device holder and at least one merchant in a first time period. The transaction data includes for each transaction request of the plurality of transaction requests at least one of the following parameters: transaction date, transaction time, transaction value, merchant type, transaction type, merchant location, or any combination thereof. The program instructions also cause the at least one processor to receive the predictive fraud detection model to be evaluated. The predictive fraud detection model is configured to categorize each transaction request as fraudulent or legitimate based at least partially on the parameters of the transaction request. The predictive fraud detection model is further configured to order the plurality of transaction requests from most likely fraudulent to least likely fraudulent. The program instructions further cause the at least one processor to generate a performance evaluation dataset including an output of the predictive fraud detection model given an input of the transaction data. The program instructions further cause the at least one processor to generate plotting data configured to cause a visual display to represent at least two model performance metrics of the performance evaluation dataset on a same output plot. The same output plot has an x-axis of percentile threshold for transaction rejection and a y-axis of percent of metric value. The at least two model performance metrics are calculated from the performance evaluation dataset and include at least one of the following: detection rate, false positive ratio, maximum detectable rate, minimum false positive ratio, model performance score, random model false positive ratio, random model detection rate, or any combination thereof. The program instructions further cause the at least one processor to automatically reject a top percent of the plurality of transaction requests for suspected fraudulent transaction activity. The top percent is determined at least partially from: a customized rejection algorithm, in response to receiving an optimization input from a model user, the optimization input including at least one of the following parameters: detect rate requirement; false positive ratio tolerance; rejection rate tolerance; review rate capacity; or any combination thereof; or, a preset rejection algorithm configured to set the top percent to maximize the difference between detect rate and false positive ratio, in response to not receiving the optimization input.

In further non-limiting embodiments or aspects, the program instructions may cause the at least one processor to, in response to receiving a metric input from the model user of a first value of a first selected model performance metric, generate and display a corresponding value of a second selected model performance metric. The plotting data is further configured to cause the visual display to represent all of the following model performance metrics on the same output plot: detection rate, false positive ratio, maximum detectable rate, minimum false positive ratio, model performance score, random model false positive ratio, and random model detection rate.

In further non-limiting embodiments or aspects, the program instructions may cause the at least one processor to receive an extrinsic evaluation of a legitimacy of each transaction request of the top percent of the plurality of transaction requests. The extrinsic evaluation may include a true positive rate and a false positive rate of the performance evaluation dataset. The program instructions may also cause the at least one processor to adjust the predictive fraud detection model based on the extrinsic evaluation. The program instructions may further cause the at least one processor to receive a second set of transaction data representative of a plurality of new transaction requests between at least one financial device holder and at least one merchant in a second time period. The program instructions may further cause the at least one processor to re-generate the performance evaluation dataset and re-generate the plotting data. The program instructions may further cause the at least one processor to automatically reject, based on the adjusted predictive fraud detection model, a top percent of the plurality of new transaction requests for suspected fraudulent transaction activity.

In further non-limiting embodiments or aspects, the program instructions may cause the at least one processor to receive at least one additional predictive fraud detection model to be evaluated. The performance evaluation dataset may also include an output of the at least one additional predictive fraud detection model to be evaluated. The plotting data may be further configured to cause the visual display to represent the predictive fraud detection model comparatively to the at least one additional predictive fraud detection model. The program instructions may also cause the at least one processor to receive a selected model from the model user. The selected model may be chosen from a set including the predictive fraud detection model and the at least one additional predictive fraud detection model. The automatic rejection of the top percent of the plurality of transaction requests may be based on the selected model, which may be configured to order the plurality of transaction requests from most likely fraudulent to least likely fraudulent. The top percent may be determined from the customized rejection algorithm. The receiving of the optimization input from the model user may include retrieving the optimization input from a database communicatively connected to at least one processor, stored with respect to a saved profile of settings for the model user. The optimization input may be at least partially based on a conversion from an input cost tolerance of the model user, wherein the at least one parameter of the optimization input is calculated from an associated cost incurred per rejected transaction request.

Other preferred and non-limiting embodiments or aspects of the present invention will be set forth in the following numbered clauses:

Clause 1: A computer-implemented method for optimizing a predictive fraud detection model and automatically enacting reactive measures based thereon, the method comprising: receiving, with at least one processor, transaction data representative of a plurality of transaction requests between at least one financial device holder and at least one merchant in a first time period, the transaction data comprising for each transaction request of the plurality of transaction requests at least one of the following parameters: transaction date, transaction time, transaction value, merchant type, transaction type, merchant location, or any combination thereof; receiving, with at least one processor, the predictive fraud detection model to be evaluated, the predictive fraud detection model configured to categorize each transaction request as fraudulent or legitimate based at least partially on the parameters of the transaction request, the predictive fraud detection model further configured to order the plurality of transaction requests from most likely fraudulent to least likely fraudulent; generating, with at least one processor, a performance evaluation dataset comprising an output of the predictive fraud detection model given an input of the transaction data; generating, with at least one processor, plotting data configured to cause a visual display to represent at least two model performance metrics of the performance evaluation dataset on a same output plot, the same output plot having an x-axis of percentile threshold for transaction rejection and a y-axis of percent of metric value, the at least two model performance metrics calculated from the performance evaluation dataset and comprising at least one of the following: detection rate, false positive ratio, maximum detectable rate, minimum false positive ratio, model performance score, random model false positive ratio, random model detection rate, or any combination thereof; and automatically rejecting, with at least one processor, a top percent of the plurality of transaction requests for suspected fraudulent transaction activity, the top percent determined at least partially from: a customized rejection algorithm, in response to receiving an optimization input from a model user, the optimization input comprising at least one of the following parameters: detect rate requirement; false positive ratio tolerance; rejection rate tolerance; review rate capacity; or any combination thereof; or, a preset rejection algorithm configured to set the top percent to maximize a difference between detect rate and false positive ratio, in response to not receiving the optimization input.

Clause 2: The computer-implemented method of clause 1, the method further comprising, in response to receiving a metric input from the model user of a first value of a first selected model performance metric, generating and displaying, with at least one processor, a corresponding value of a second selected model performance metric, wherein the plotting data is further configured to cause the visual display to represent all of the following model performance metrics on the same output plot: detection rate, false positive ratio, maximum detectable rate, minimum false positive ratio, model performance score, random model false positive ratio, and random model detection rate.

Clause 3: The computer-implemented method of clause 1 or 2, further comprising: receiving, with at least one processor, an extrinsic evaluation of a legitimacy of each transaction request of the top percent of the plurality of transaction requests, the extrinsic evaluation comprising a true positive rate and a false positive rate of the performance evaluation dataset; adjusting, with at least one processor, the predictive fraud detection model based on the extrinsic evaluation; receiving, with at least one processor, a second set of transaction data representative of a plurality of new transaction requests between at least one financial device holder and at least one merchant in a second time period; re-generating, with at least one processor, the performance evaluation dataset; re-generating, with at least one processor, the plotting data; and, automatically rejecting, with at least one processor and based on the adjusted predictive fraud detection model, a top percent of the plurality of new transaction requests for suspected fraudulent transaction activity.

Clause 4: The computer-implemented method of any of clauses 1-3, further comprising receiving, with at least one processor, at least one additional predictive fraud detection model to be evaluated; wherein: the performance evaluation dataset further comprises an output of the at least one additional predictive fraud detection model to be evaluated; and, the plotting data is further configured to cause the visual display to represent the predictive fraud detection model comparatively to the at least one additional predictive fraud detection model.

Clause 5: The computer-implemented method of any of clauses 1-4, further comprising: receiving, with at least one processor, a selected model from the model user, the selected model chosen from a set comprising the predictive fraud detection model and the at least one additional predictive fraud detection model, wherein the automatic rejection of the top percent of the plurality of transaction requests is based on the selected model, which is configured to order the plurality of transaction requests from most likely fraudulent to least likely fraudulent.

Clause 6: The computer-implemented method of any of clauses 1-5, wherein the top percent is determined from the customized rejection algorithm, and wherein the receiving of the optimization input from the model user comprises retrieving, with at least one processor, the optimization input from a database communicatively connected to at least one processor, stored with respect to a saved profile of settings for the model user.

Clause 7: The computer-implemented method of any of clauses 1-6, wherein the top percent is determined from the customized rejection algorithm, and wherein the optimization input is at least partially based on a conversion from an input cost tolerance of the model user, wherein the at least one parameter of the optimization input is calculated from an associated cost incurred per rejected transaction request.

Clause 8: A system for optimizing a predictive fraud detection model and automatically enacting reactive measures based thereon, the system comprising at least one server computer including at least one processor, the at least one server computer programmed and/or configured to: receive transaction data representative of a plurality of transaction requests between at least one financial device holder and at least one merchant in a first time period, the transaction data comprising for each transaction request of the plurality of transaction requests at least one of the following parameters: transaction date, transaction time, transaction value, merchant type, transaction type, merchant location, or any combination thereof; receive the predictive fraud detection model to be evaluated, the predictive fraud detection model configured to categorize each transaction request as fraudulent or legitimate based at least partially on the parameters of the transaction request, the predictive fraud detection model further configured to order the plurality of transaction requests from most likely fraudulent to least likely fraudulent; generate a performance evaluation dataset comprising an output of the predictive fraud detection model given an input of the transaction data; generate plotting data configured to cause a visual display to represent at least two model performance metrics of the performance evaluation dataset on a same output plot, the same output plot having an x-axis of percentile threshold for transaction rejection and a y-axis of percent of metric value, the at least two model performance metrics calculated from the performance evaluation dataset and comprising at least one of the following: detection rate, false positive ratio, maximum detectable rate, minimum false positive ratio, model performance score, random model false positive ratio, random model detection rate, or any combination thereof; and automatically reject a top percent of the plurality of transaction requests for suspected fraudulent transaction activity, the top percent determined at least partially from: a customized rejection algorithm, in response to receiving an optimization input from a model user, the optimization input comprising at least one of the following parameters: detect rate requirement; false positive ratio tolerance; rejection rate tolerance; review rate capacity; or any combination thereof; or, a preset rejection algorithm configured to set the top percent to maximize a difference between detect rate and false positive ratio, in response to not receiving the optimization input.

Clause 9: The system of clause 8, the at least one server computer further programmed and/or configured to, in response to receiving a metric input from the model user of a first value of a first selected model performance metric, generate and display a corresponding value of a second selected model performance metric, wherein the plotting data is further configured to cause the visual display to represent all of the following model performance metrics on the same output plot: detection rate, false positive ratio, maximum detectable rate, minimum false positive ratio, model performance score, random model false positive ratio, and random model detection rate.

Clause 10: The system of clause 8 or 9, the at least one server computer further programmed and/or configured to: receive an extrinsic evaluation of a legitimacy of each transaction request of the top percent of the plurality of transaction requests, the extrinsic evaluation comprising a true positive rate and a false positive rate of the performance evaluation dataset; adjust the predictive fraud detection model based on the extrinsic evaluation; receive a second set of transaction data representative of a plurality of new transaction requests between at least one financial device holder and at least one merchant in a second time period; re-generate the performance evaluation dataset; re-generate the plotting data; and, automatically reject, based on the adjusted predictive fraud detection model, a top percent of the plurality of new transaction requests for suspected fraudulent transaction activity.

Clause 11: The system of any of clauses 8-10, the at least one server computer further programmed and/or configured to receive at least one additional predictive fraud detection model to be evaluated; wherein: the performance evaluation dataset further comprises an output of the at least one additional predictive fraud detection model to be evaluated; and, the plotting data is further configured to cause the visual display to represent the predictive fraud detection model comparatively to the at least one additional predictive fraud detection model.

Clause 12: The system of any of clauses 8-11, the at least one server computer further programmed and/or configured to: receive a selected model from the model user, the selected model chosen from a set comprising the predictive fraud detection model and the at least one additional predictive fraud detection model, wherein the automatic rejection of the top percent of the plurality of transaction requests is based on the selected model, which is configured to order the plurality of transaction requests from most likely fraudulent to least likely fraudulent.

Clause 13: The system of any of clauses 8-12, wherein the top percent is determined from the customized rejection algorithm, and wherein the receiving of the optimization input from the model user comprises retrieving the optimization input from a database communicatively connected to at least one processor, stored with respect to a saved profile of settings for the model user.

Clause 14: The system of any of clauses 8-13, wherein the top percent is determined from the customized rejection algorithm, and wherein the optimization input is at least partially based on a conversion from an input cost tolerance of the model user, wherein the at least one parameter of the optimization input is calculated from an associated cost incurred per rejected transaction request.

Clause 15: A computer program product for optimizing a predictive fraud detection model and automatically enacting reactive measures based thereon, the computer program product comprising at least one non-transitory computer-readable medium including program instructions that, when executed by at least one processor, cause the at least one processor to: receive transaction data representative of a plurality of transaction requests between at least one financial device holder and at least one merchant in a first time period, the transaction data comprising for each transaction request of the plurality of transaction requests at least one of the following parameters: transaction date, transaction time, transaction value, merchant type, transaction type, merchant location, or any combination thereof; receive the predictive fraud detection model to be evaluated, the predictive fraud detection model configured to categorize each transaction request as fraudulent or legitimate based at least partially on the parameters of the transaction request, the predictive fraud detection model further configured to order the plurality of transaction requests from most likely fraudulent to least likely fraudulent; generate a performance evaluation dataset comprising an output of the predictive fraud detection model given an input of the transaction data; generate plotting data configured to cause a visual display to represent at least two model performance metrics of the performance evaluation dataset on a same output plot, the same output plot having an x-axis of percentile threshold for transaction rejection and a y-axis of percent of metric value, the at least two model performance metrics calculated from the performance evaluation dataset and comprising at least one of the following: detection rate, false positive ratio, maximum detectable rate, minimum false positive ratio, model performance score, random model false positive ratio, random model detection rate, or any combination thereof; and automatically reject a top percent of the plurality of transaction requests for suspected fraudulent transaction activity, the top percent determined at least partially from: a customized rejection algorithm, in response to receiving an optimization input from a model user, the optimization input comprising at least one of the following parameters: detect rate requirement; false positive ratio tolerance; rejection rate tolerance; review rate capacity; or any combination thereof; or, a preset rejection algorithm configured to set the top percent to maximize a difference between detect rate and false positive ratio, in response to not receiving the optimization input.

Clause 16: The computer program product of clause 15, wherein the program instructions further cause the at least one processor to, in response to receiving a metric input from the model user of a first value of a first selected model performance metric, generate and display a corresponding value of a second selected model performance metric, wherein the plotting data is further configured to cause the visual display to represent all of the following model performance metrics on the same output plot: detection rate, false positive ratio, maximum detectable rate, minimum false positive ratio, model performance score, random model false positive ratio, and random model detection rate.

Clause 17: The computer program product of clause 15 or 16, wherein the program instructions further cause the at least one processor to: receive an extrinsic evaluation of a legitimacy of each transaction request of the top percent of the plurality of transaction requests, the extrinsic evaluation comprising a true positive rate and a false positive rate of the performance evaluation dataset; adjust the predictive fraud detection model based on the extrinsic evaluation; receive a second set of transaction data representative of a plurality of new transaction requests between at least one financial device holder and at least one merchant in a second time period; re-generate the performance evaluation dataset; re-generate the plotting data; and, automatically reject, based on the adjusted predictive fraud detection model, a top percent of the plurality of new transaction requests for suspected fraudulent transaction activity.

Clause 18: The computer program product of any of clauses 15-17, wherein the program instructions further cause the at least one processor to receive at least one additional predictive fraud detection model to be evaluated; wherein: the performance evaluation dataset further comprises an output of the at least one additional predictive fraud detection model to be evaluated; and, the plotting data is further configured to cause the visual display to represent the predictive fraud detection model comparatively to the at least one additional predictive fraud detection model.

Clause 19: The computer program product of any of clauses 15-18, wherein the program instructions further cause the at least one processor to: receive a selected model from the model user, the selected model chosen from a set comprising the predictive fraud detection model and the at least one additional predictive fraud detection model, wherein the automatic rejection of the top percent of the plurality of transaction requests is based on the selected model, which is configured to order the plurality of transaction requests from most likely fraudulent to least likely fraudulent.

Clause 20: The computer program product of any of clauses 15-19, wherein the top percent is determined from the customized rejection algorithm, and wherein the receiving of the optimization input from the model user comprises retrieving the optimization input from a database communicatively connected to at least one processor, stored with respect to a saved profile of settings for the model user.

Clause 21: The computer program product of any of clauses 15-20, wherein the top percent is determined from the customized rejection algorithm, and wherein the optimization input is at least partially based on a conversion from an input cost tolerance of the model user, wherein the at least one parameter of the optimization input is calculated from an associated cost incurred per rejected transaction request.

Clause 22: A computer-implemented method for optimizing a predictive condition classification model and automatically enacting reactive measures based thereon, the method comprising: receiving, with at least one processor, event data representative of a plurality of events, the event data comprising for each event of the plurality of events, one or more quantitative or categorical parameters; receiving, with at least one processor, the predictive condition classification model to be evaluated, the predictive condition classification model configured to categorize each event as satisfying a condition or not based at least partially on the parameters of the event, the predictive condition classification model further configured to order the plurality of events from most likely satisfying the condition to least likely to satisfy the condition; generating, with at least one processor, a performance evaluation dataset comprising an output of the predictive condition classification model given an input of the event data; generating, with at least one processor, plotting data configured to cause a visual display to represent at least two model performance metrics of the performance evaluation dataset on a same output plot, the same output plot has an x-axis of percentile threshold for condition rejection and a y-axis of percent of metric value, the at least two model performance metrics calculated from the performance evaluation dataset and comprising at least one of the following: detection rate, false positive ratio, maximum detectable rate, minimum false positive ratio, model performance score, random model false positive ratio, random model detection rate, or any combination thereof; automatically rejecting, with at least one processor, a top percent of the plurality of events for suspected satisfaction of the condition, the top percent determined at least partially from: a customized rejection algorithm, in response to receiving an optimization input from a model user, the optimization input comprising at least one of the following parameters: detect rate requirement; false positive ratio tolerance; rejection rate tolerance; review rate capacity; or any combination thereof; or, a preset rejection algorithm configured to set the top percent to maximize a difference between detect rate and false positive ratio, in response to not receiving the optimization input.

These and other features and characteristics of the present invention, as well as the methods of operation and functions of the related elements of structures and the combination of parts and economies of manufacture, will become more apparent upon consideration of the following description, and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular forms of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying figures, in which.

DETAILED DESCRIPTION OF THE INVENTION

Figure 1:
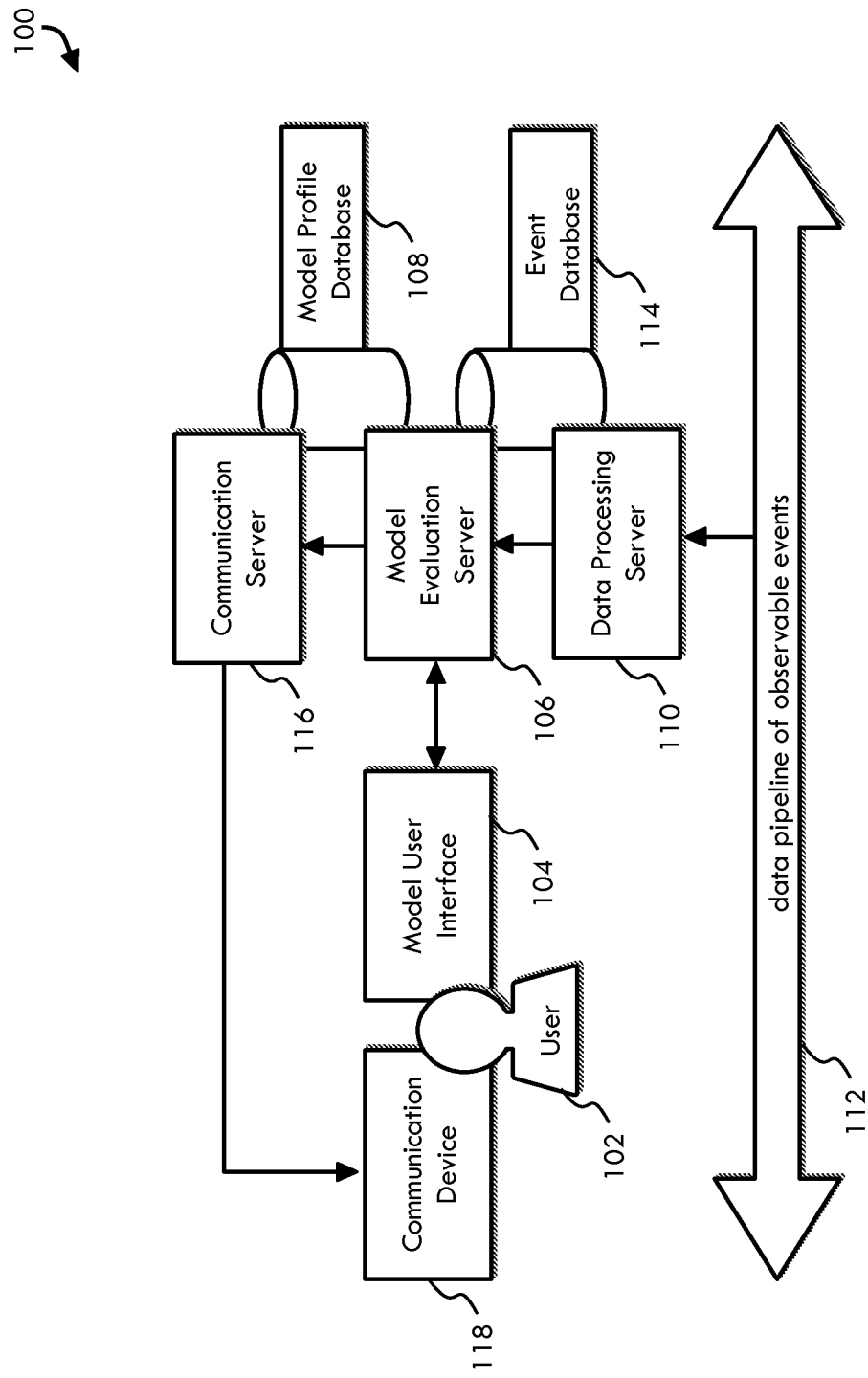
FIG. 1 is a schematic diagram of one non-limiting embodiment or aspect of a system and method for optimizing a predictive condition classification model and automatically enacting reactive measures based thereon.

For purposes of the description hereinafter, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "financial device" may refer to a portable payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant, a security card, an access card, a wireless terminal, and/or a transponder, as examples. The financial device may include a volatile or a non-volatile memory to store information, such as an account identifier or a name of the account holder. The financial device may store account credentials locally on the device, in digital or non-digital representation, or may facilitate accessing account credentials stored in a medium that is accessible by the financial device in a connected network.

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The term "account data," as used herein, refers to any data concerning one or more accounts for one or more users. Account data may include, for example, one or more account identifiers, user identifiers, transaction histories, balances, credit limits, issuer institution identifiers, and/or the like.

In non-limiting embodiments or aspects of the present invention, the described systems and methods improve the effectiveness of automated predictive decision model systems by allowing for optimization of model deployment based on model operating characteristics (MOC). In a non-limiting example of a predictive fraud detection model, described systems and methods allow for model users to optimize the percent of transactions flagged as fraudulent by setting the threshold at optimized levels, relative to detection rate requirements, tolerance for false positives, tolerance for missed fraudulent activity, and the capacity of a fraud detection system to review transaction requests. Because the described systems can be employed in combination with data processing servers, e.g., transaction processing servers, the model evaluation, optimization, and deployment can be conducted in real-time with incoming data events, e.g., transaction requests. Moreover, historic data can be internalized to improve evaluated predictive models, based on actual performance data, allowing for recursive improvements of the predictive model. Multiple predictive models may be analyzed side-by-side, and over various time windows of a period of observed data, allowing for variable deployment of detection models and model-to-model comparison. Furthermore, the described systems and methods may allow for communicative feedback to model users based on the performance of the optimized decision models, which improves interoperability of the entire system.

In non-limiting embodiments or aspects of the present invention, it will be appreciated that there is a wide variety of detection models that may be evaluated and employed under the methods described herein, including, but not limited to: detection of fraudulent payment transactions; detection of spam emails in an email hosting server; identification of objects in an image; labeling of genome sequencing and structural genomics; diagnosis of a certain disease based on patient diagnostic test outcomes; classification of illegal internet requests to a certain service provider; recognition of malware behaviors in a computer system; perception of appropriate words in a computer-based linguistic translation system. Many configurations are possible.

With specific reference to FIG. 1, and in non-limiting embodiments or aspects of the invention, provided is a system 100 for optimizing a predictive condition classification model and automatically enacting reactive measures based thereon. A model user 102 may use a model user interface 104 (e.g., application programming interface, web portal, etc.), to communicate and interact with a model evaluation server 106. In the non-limiting embodiment of a fraud detection model, the model user 102 may be a merchant, an issuer bank, an acquirer bank, fraud detection personnel, and/or the like. The model evaluation server 106 is programmed and/or configured to communicate with a model profile database 108, receive decision models to be evaluated, evaluate decision models, and generate model evaluation data. The models to be evaluated may be input by a model user 102 via the model user interface 104, e.g., in a comma-separated value (CSV) file, an extensible markup language (XML) file, and/or the like to a file upload window. The models to be evaluated may alternatively be received from the model profile database 108, where they are stored after being set up by fraud detection personnel, machine learning algorithms, model users 102, and/or the like. The model profile database 108 may be programmed and/or configured to store decision models, model user profile data, model user preferences/settings, optimization characteristics, and/or the like. It will be appreciated that many configurations are possible.

With further reference to FIG. 1, and in further non-limiting embodiments or aspects of the invention, the model evaluation server 106 may be communicatively connected to a data processing server 110, which is programmed and/or configured to receive data from a data pipeline of observable events 112. The model evaluation server 106 may be the same server as the data processing server 110. The data received by the data processing server 110 from the data pipeline 112 are the data of observable events that are being evaluated for satisfying a specific condition. In the non-limiting embodiment of fraud detection models, the data events may be transaction requests. In the non-limiting embodiment of spam email detection, the data events may be emails. The received data may be stored in an event database 114, which may be the same database as the model profile database 108. The observable events may occur concurrently with the collection and processing of data by the data processing server 110, such that decision models may be evaluated and employed in real-time, relative to the flow of data in the data pipeline 112. The data set of observable events may be segmented into subcategories for analysis, including time windows. It will be appreciated that many configurations are possible.

With further reference to FIG. 1, and in further non-limiting embodiments or aspects of the invention, the system 100 includes a communication server 116, which may be the same server as the model evaluation server 106 and/or the data processing server 110. Any of the described servers may be communicatively connected to the described databases. The communication server 116 is programmed and/or configured to send alerts or notifications to a communication device 118 of the model user 102 that are related to the performance of the evaluated decision model. The communication server 116 may also communicate directly with/through the model user interface 104. The model user interface 104 may be accessible via the communication device 118. In the non-limiting embodiment of fraud detection models, the communication may be a notification related to the number of transactions flagged as fraudulent, the transaction value of the transactions flagged as fraudulent, the true positive rate of flagged transactions, the false positive rate of flagged transactions, and/or the like. If the model user 102 has set up and saved a number of decision models in the model profile database 108 and configured the model evaluation server 106 to always choose the most optimal decision model, the model evaluation server 106 may automatically switch between decision models, in which case the communication server 116 may notify the model user 102 accordingly. It will be appreciated that many configurations are possible.

Figure 2:
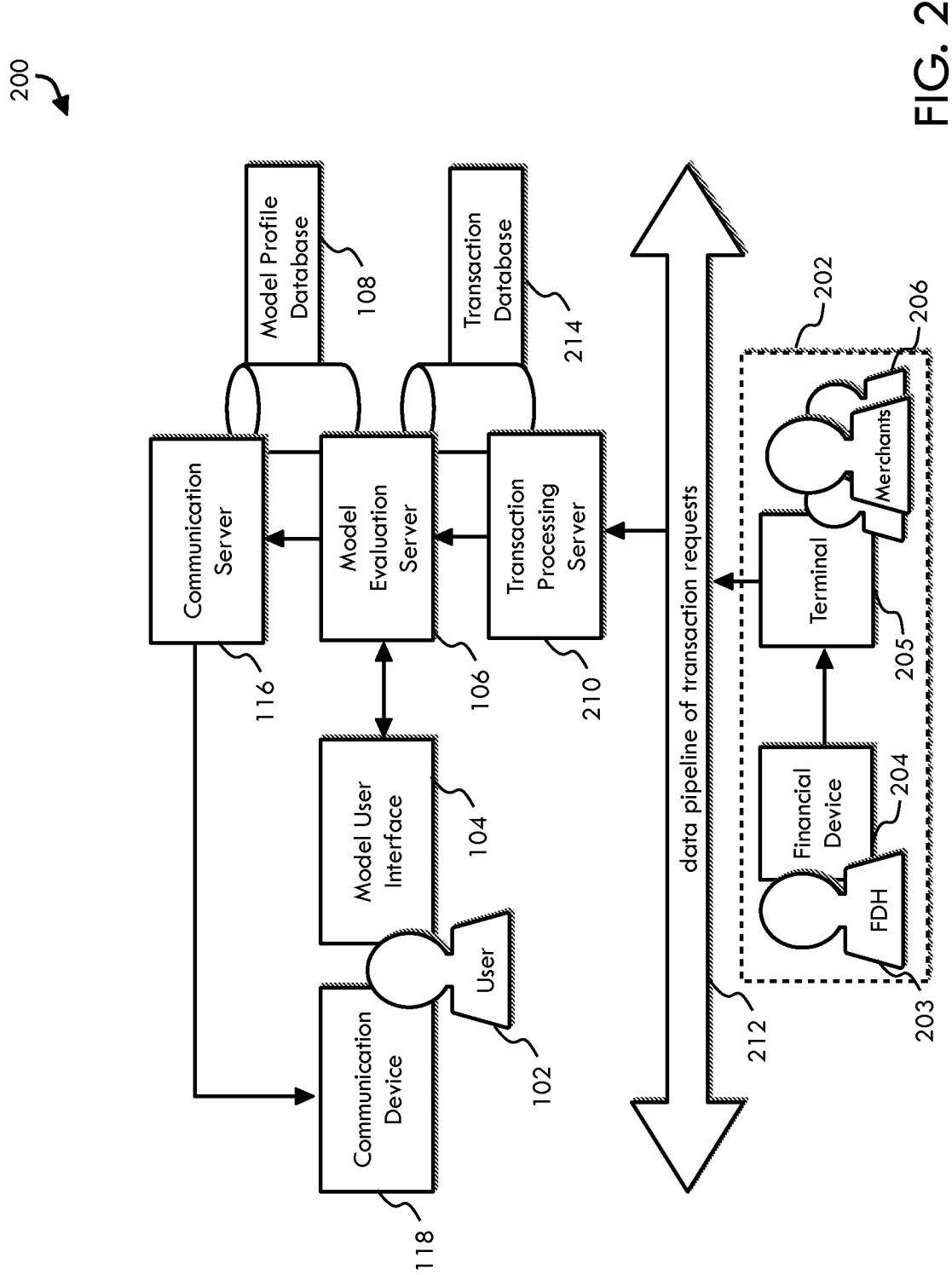
FIG. 2 is a schematic diagram of one non-limiting embodiment or aspect of a system and method for optimizing a predictive fraud detection model and automatically enacting reactive measures based thereon.

With specific reference to FIG. 2, and in non-limiting embodiments or aspects of the invention, provided is a system 200 for optimizing a predictive fraud detection model and automatically enacting reactive measures based thereon. The model user 102, model user interface 104, model evaluation server 106, model profile database 108, communication server 116, and communication device 118, may be similarly configured for the non-limiting embodiment of fraud detection. The model user 102 of fraud detection models may be merchants, issuer banks, acquirer banks, fraud detection personnel, transaction service providers, and/or the like. The system includes a transaction processing server 210 for receiving transaction requests from the data pipeline of transaction requests 212. The data pipeline 212 includes a number of transaction requests occurring in real-time, each transaction request interaction 202 including a financial device holder 203 with a financial device 204 interacting with a point-of-sale (POS) terminal 205 of a merchant 206 to complete a transaction. The transaction processing server 210 receives the transaction data from each of these transaction request interactions 202. Transaction data of the transaction requests may be stored in a transaction database 214 that is communicatively connected to one or more of the depicted servers. The transaction data may include one or more of the following data: transaction date, transaction time, transaction value, merchant type, transaction type, merchant location, or any combination thereof. The transaction data is the input to the predictive fraud detection models, such that a decision can be made as to whether or not a transaction is fraudulent, and how likely so. It will be appreciated that many configurations are possible.

Figure 3:
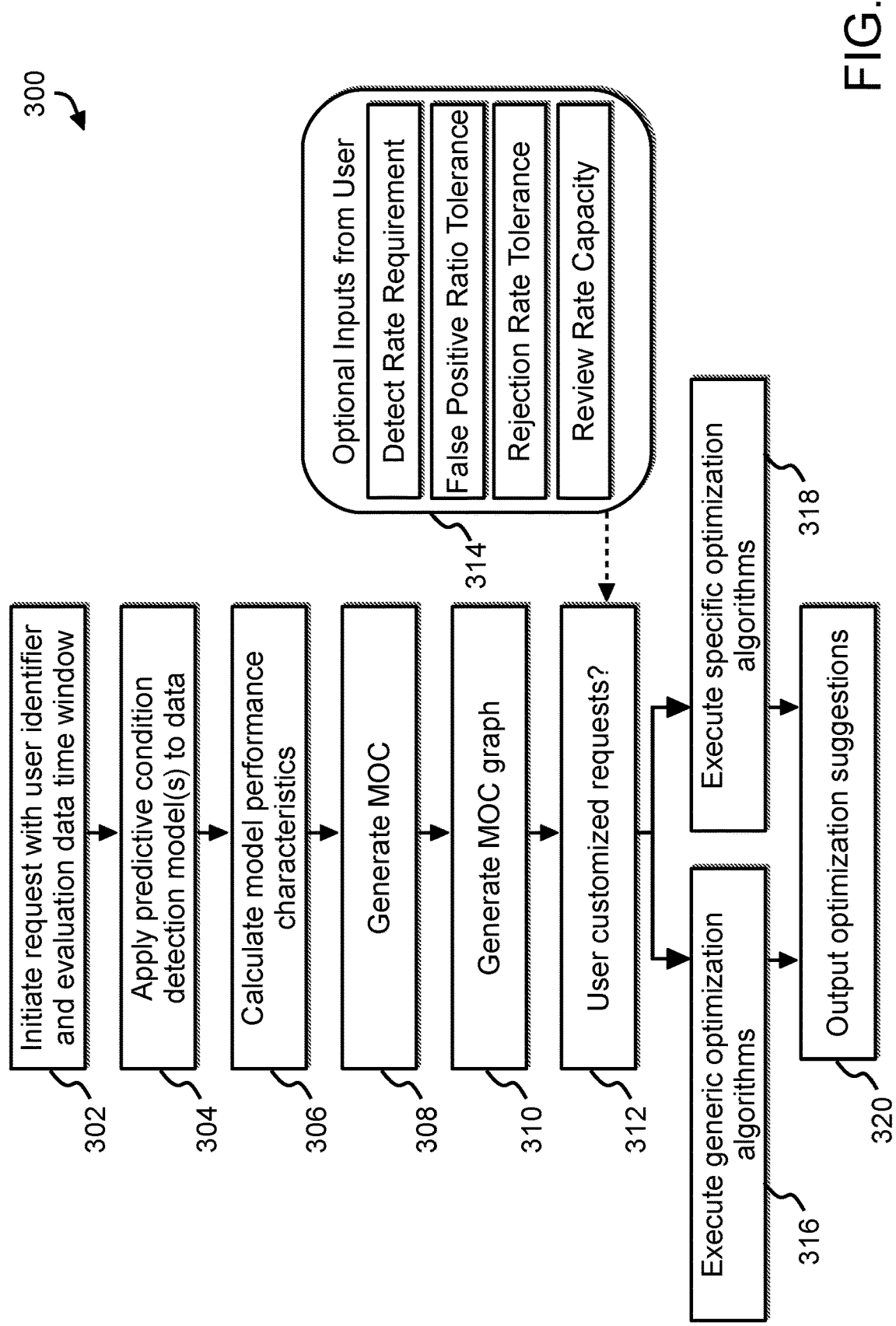
FIG. 3 is a flow diagram of one non-limiting embodiment or aspect of a system and method for optimizing a predictive condition classification model and automatically enacting reactive measures based thereon.

With specific reference to FIG. 3, and in non-limiting embodiments or aspects of the invention, provided is a method 300 for optimizing a predictive condition classification model and automatically enacting reactive measures based thereon. The depicted method 300 may be executed by one or more processors associated with one or more of the servers depicted in FIGS. 1 and 2. At step 302, a model evaluation request is initiated by a model user using a model user interface. The request may contain any number of request data, including, but not limited to, user identifier, model data, model identifier, time window of data to be evaluated, and/or the like. At step 304, one or more predictive condition classification models are applied to the received data that is stored in the event database. If the model user specified a time window, the evaluated data set may be limited to the specified time window. The one or more models to be applied to the received data may be input by the model user or identified for retrieval from the model profile database. At step 306, the model performance characteristics are calculated by operation of the formulae discussed below. At step 308, one or model operational characteristics (MOC) may be generated, including, but not limited to: detect rate; false positive ratio; maximum detectable rate; minimum false positive ratio; model score; random false positive ratio; random detect rate; detection concentration; virtual detect rate, or any combination thereof. At step 310, a graph/plot of the MOC may be generated. Multiple MOC may be plotted on the same output plot, which has an x-axis of percentile threshold for transaction rejection and a y-axis of percent of metric value. It will be appreciated that these axes may be reversed. Example MOC curves are shown in greater detail in FIGS. 4 and 5. It will be appreciated that many configurations are possible.

With further reference to FIG. 3, and in further non-limiting embodiments or aspects of the invention, at step 312, the user request may be evaluated for model evaluation customization. For example, the user may have input one or more optional inputs 314, including, but not limited to, the detect rate requirement (e.g., a number or value of condition-satisfying events that must be detected), a false positive ratio tolerance (e.g., a number or value of events that can be incorrectly categorized as satisfying the evaluated condition), a rejection rate tolerance (e.g., a number or value of events that can be incorrectly categorized as not satisfying the evaluated condition), a review rate capacity (e.g., a number or value of events that may more closely reviewed to determine if the evaluated condition has occurred), and/or the like. If the user did not specify optional inputs 314, a generic optimization algorithm may be executed, at step 316, to evaluate and deploy one or more predictive condition classification models. For example, see the below discussion of Example Application I: Global Automatic Decision Optimization. If the user did specify optional inputs 314, a specific optimization algorithm may be executed, at step 318, to evaluate and deploy one or more predictive condition classification models, based on the requirements, tolerances, and/or capacities specified by the user. For example, see the below discussion of Example Application II: Segmentation Automatic Decision Optimization. Whichever optimization algorithm is executed, the model evaluation server may output optimization suggestions, at step 320, based on the underlying MOC of the evaluated model. It will be appreciated that many configurations are possible.

With further reference to FIG. 3, and in further non-limiting embodiments or aspects of the invention, the depicted method 300 may be recursively operated based on past performance and additional collected data. For instance, an extrinsic evaluation of each event as satisfying a condition may be received. In the non-limiting example of fraudulent transaction identification, the extrinsic evaluation may be an input of transactions as fraudulent or legitimate based on an audit. The extrinsic evaluation may include a true positive rate and a false positive rate of the performance evaluation dataset. In response to receiving the extrinsic evaluation of model performance, the predictive condition classification model may be adjusted, to change the parameters of determining the likelihood of an event as satisfying a condition. Subsequently, a second set of transaction data may be received, representative of a plurality of new transaction requests in a second time period. The performance evaluation dataset and the plotting data may be re-generated, and a new threshold of rejection/detection may be enacted. It will be appreciated that many configurations are possible.

1. Baseline Execution of Model Operational Characteristic (MOC) Curve

Models analyzed by non-limiting embodiments herein include decision models configured to detect/determine one or more conditions/events and act thereon. Decision models may be binary, such as "yes/no" decision model, e.g., determining whether something is or is not a fraudulent transaction, determining whether something is or is not a spam email, and/or the like. Decision models may also be configured to detect and react to a number of condition/event categories, where one category is analyzed at a time. For example, higher order decision models may be broken down and treated as binary decision models, where the first category is the target condition/event, and the second category is every other condition/event. In this manner, each of the conditions/events can be stepped through in the following format: "the set of X" and "the set of not X."

A Model Operational Characteristic (MOC) curve may display a number of operational characteristics of an input decision model, including, but not limited to: detect rate; false positive ratio; maximum detectable rate; minimum false positive ratio; model score; random false positive ratio; random detect rate; detection concentration; virtual detect rate, or any combination thereof. The operational characteristics may be determined by evaluating the performance of a decision model on a set of training or historic event data.

A predictive classification model may generate a score (S) index for each event evaluated by the model. The score index may range from 0 to 99 (decimal or integers). The score may be ascending, ordered according to the likelihood of detecting "condition X," namely, the larger the score value is, the higher the likelihood of the request is a "condition X."

With specific application to fraud detection, as a non-limiting example, if a classification model outputs a score that is large for a given evaluated transaction, it implies the likelihood of that transaction being fraudulent is large. If the classification model outputs a small score, it implies that the likelihood of that transaction being fraudulent is small. With a collection of scores on a sufficient number of transactions, a probability distribution of the model score can be formed. Due to the relationship between the order of the score and the likelihood of the transaction being fraudulent, the analysis is focused on the right tail probability/proportion (RTP) of the score distribution. Given a score of certain value, e.g., 10, the right tail proportion is the percent of total data points (TDP) that are larger than 10. In such a case, the score value may be considered to be a threshold value. If used as a threshold for determining fraudulent transactions, then acting on the model would classify those transactions that are greater than 10 as fraudulent transactions. In a similar manner, the right tail proportion may also be referred to as the "top percentile of risk" (TPR).

The TPR is a function of score, and as such, a more complete representation of the TPR would be: the top percentile of risk for a given score has a corresponding value. Inversely, a score may be determined for a top percentile of risk at a given value of TPR. A non-limiting example of the relationship between model score and TPR is shown below.

TABLE 1

| Model score value | 0 | 1 | 2 | ... | 50 | 51 | ... | 90 | 91 | ... | 98 | 99 |
|---|---|---|---|---|---|---|---|---|---|---|---|---|
| TPR of the score | 100% | 99% | 97.60% | ... | 6.73% | 6.32% | ... | 2.78% | 2.43% | ... | 0.27% | 0.00% |

TPR may also be represented by the following relationship:

$$TPR(S = s) = \frac{\text{total number of data points scored larger than } s}{\text{total number of data points}} \quad \text{Formula 1}$$

Operational characteristics of a model may be analyzed in relation to a review rate (RR). Review rate is the proportion of data that is being reviewed. If the top 2% of risk is being reviewed, the review rate is 2%. If transactions between top 2% of risk and top 5% are being reviewed, the review rate is 3%. By comparison, the term "top percentile of risk" may be used herein to refer to evaluating a top percent of data points of a general classification model, for various applications, and it is used broadly herein for convenience, but it may not always refer to classification systems where "risk," in the sense of risk of loss, is involved.

For ease of explanation across multiple applications, a target condition/event to be detected may be referred to as "condition X." For a fraudulent transaction decision model, condition X may be a fraudulent transaction. For a spam email decision model, condition X may be a spam email. Determining an efficient TPR for classification/detection is paramount to all decision models, so that a sufficient number of condition X are detected (e.g., correctly flagged as fraudulent transactions), but non-condition X are not categorized along with condition X (e.g., legitimate transactions being flagged as fraudulent). It will be appreciated that many configurations are possible.

The detect rate (DR) may be represented by the following relationship:

$$DR = \frac{\text{Number of Condition } X \text{ at } TPR}{\text{Total Number of Condition } X} \quad \text{Formula 2}$$

In other words, for any given TPR of data points, the DR is the number of condition X present in the reviewed data points divided by the total number of condition X in the entire dataset. Since score and TPR may have a one-to-one mapping relationship, the above relationship may be interpreted as DR is the percent of condition X when score is larger than a threshold of condition X. In the non-limiting embodiment of fraudulent transaction decision models, if there are 100 fraudulent transactions for a given RR of the top 2% of all transactions, but the total number of fraudulent transactions over all transactions is 400, then the DR would be 25% at the TPR of 2%.

The false positive ratio (FPR), may be represented by the following relationship:

$$FPR = \frac{\text{Number of Not Condition } X \text{ at } TPR}{\text{Number of Condition } X \text{ at } TPR} \quad \text{Formula 3}$$

In other words, for any given TPR of data points, the FPR is the ratio of non-X conditions to X conditions. In the non-limiting embodiment of fraudulent transaction decision models, if the top 2% of transactions are tagged as fraudulent, and at that top percentile of risk 20 of the transactions are legitimate while the total number of fraudulent transactions is 100, then the FPR would be 0.20.

The maximum detectable rate (Max DR) (i.e., the maximum percent of condition X that can be detected at a given TPR) may be represented by the following relationship:

$$\text{Max } DR = \begin{cases} \dfrac{TPR}{\text{Total Condition } X \text{ \% in } TDP}, & \begin{array}{l} TPR < \text{Total condition} \\ X \text{ \% in } TDP \end{array} \\ 1, & \begin{array}{l} TPR \geq \text{Total Condition} \\ X \text{ \% in } TDP \end{array} \end{cases} \quad \text{Formula 4}$$

In other words, for a number of top risky data points, if the total number of classified is less than the total number of condition X, then the Max DR is the percent of classified data points, relative to the total number of condition X. In the non-limiting embodiment of fraudulent transaction decision models, if the top 125 risky transactions are classified, but there are 400 fraudulent transactions in the entire dataset, then the Max DR is 31.25%. Put another way, if the fraudulent transaction decision model is perfect at detecting fraudulent transactions, and if the top 125 transactions are flagged as fraudulent but the rest are not acted on, then the best detection rate the model could achieve at that TPR is 31.25%. Max DR is an effective comparison for a decision model's actual DR.

The minimum false positive ratio (Min FPR) (i.e., the lowest FPR achievable by a perfect decision model) may be represented by the following relationship:

$$\text{Min } FPR = \begin{cases} 0, & \begin{array}{l} TPR < \text{Total condition} \\ X \text{ \% in } TDP \end{array} \\ \dfrac{\text{Number of Not Condition } X \text{ at } TPR}{\text{Total Condition } X \text{ \% in } TDP}, & \begin{array}{l} TPR \geq \text{Total Condition} \\ X \text{ \% in } TDP \end{array} \end{cases} \quad \text{Formula 5}$$

In other words, a perfect decision model would not falsely detect any non-condition X, up until the top percentile of risk was set higher than the total number of condition X percent in the dataset. After that point, non-condition X will begin to be included. Therefore, an optimal review rate is one set exactly at the total condition X in the data set. Any less, then some condition X are not tagged. Any more, then non-condition X are tagged incorrectly.

The random false positive ratio (RFPR) may be defined as the false positive ratio for a model that has zero performance, i.e., randomly labeling events as satisfying condition X or non-condition X, with no positive ability to detect condition X. The RFPR may be defined by the following relationship:

$$RFPR = \frac{\text{Total Number of Not Condition } X \text{ at } TPR}{\text{Number of Condition } X \text{ at } TPR} \quad \text{Formula 6}$$

In other words, for a zero performance model, the false positive ratio of any given top percentile of risk will be equal to the total non-X conditions over the total X conditions. It does not have significantly better or worse false positive ratios by reviewing at higher or lower rates.

The random detect rate (RDR) may be defined as the detect rate for a model that has zero performance. If all events are randomly ordered, then every increment of review rate has a random chance of tagging an event as satisfying condition X, the chance being equal to the proportion of events satisfying condition X relative to the number of events. At a top percentile of risk of 0%, the RDR percent is 0%. At a top percentile of risk of 100%, the RDR percent is 100%, given that all events would have been tagged as satisfying condition X, which would accordingly capture all true condition X.

A false positive ratio percent (FPRP) may be represented by the following relationship:

$$FPRP = \frac{\text{Number of Not Condition } X \text{ at } TPR}{\text{Number of Condition } X \text{ at } TPR} \div RFPR \qquad \text{Formula 7}$$

In other words, a FPRP is the false positive ratio at a decision threshold (based on top percentile of risk, for example) as a percent of the random false positive ratio. In the non-limiting embodiment of a fraudulent transaction decision model, consider a dataset of 980 legitimate transactions and 20 fraudulent transactions. The RFPR is 49, i.e., if randomly labeling this dataset of transactions as fraudulent or not, it is 49 times more likely that the label is a false positive than a true positive. By way of further example, if evaluating a fraud detection model where transactions are ordered by risk assessment, and the top 2% are flagged as fraudulent (TPR=2%), and if that top 2% happened to have caught 16 fraudulent transactions and 4 legitimate transactions, then the FPR at that top percentile of risk is 0.25, and the FPRP of at that top percentile of risk is approximately 0.51%. As the top percentile of risk threshold is increased and more and more transactions are labeled as fraudulent, the FPR and the FPRP will increase as more and more legitimate transactions are labeled as fraudulent.

Detection Concentration (DC) May be Represented by the Following Relationship:

$$DC = \frac{\text{Number of Condition } X \text{ at } TPR}{\text{Total Number of Data Points at } TPR} \qquad \text{Formula 8}$$

Virtual Detect Rate (VDR) May be Represented by the Following Relationship:

$$VDR = \frac{DR \text{ at } TPR}{\text{Max } DR \text{ at } TPR} \qquad \text{Formula 9}$$

Figure 4:
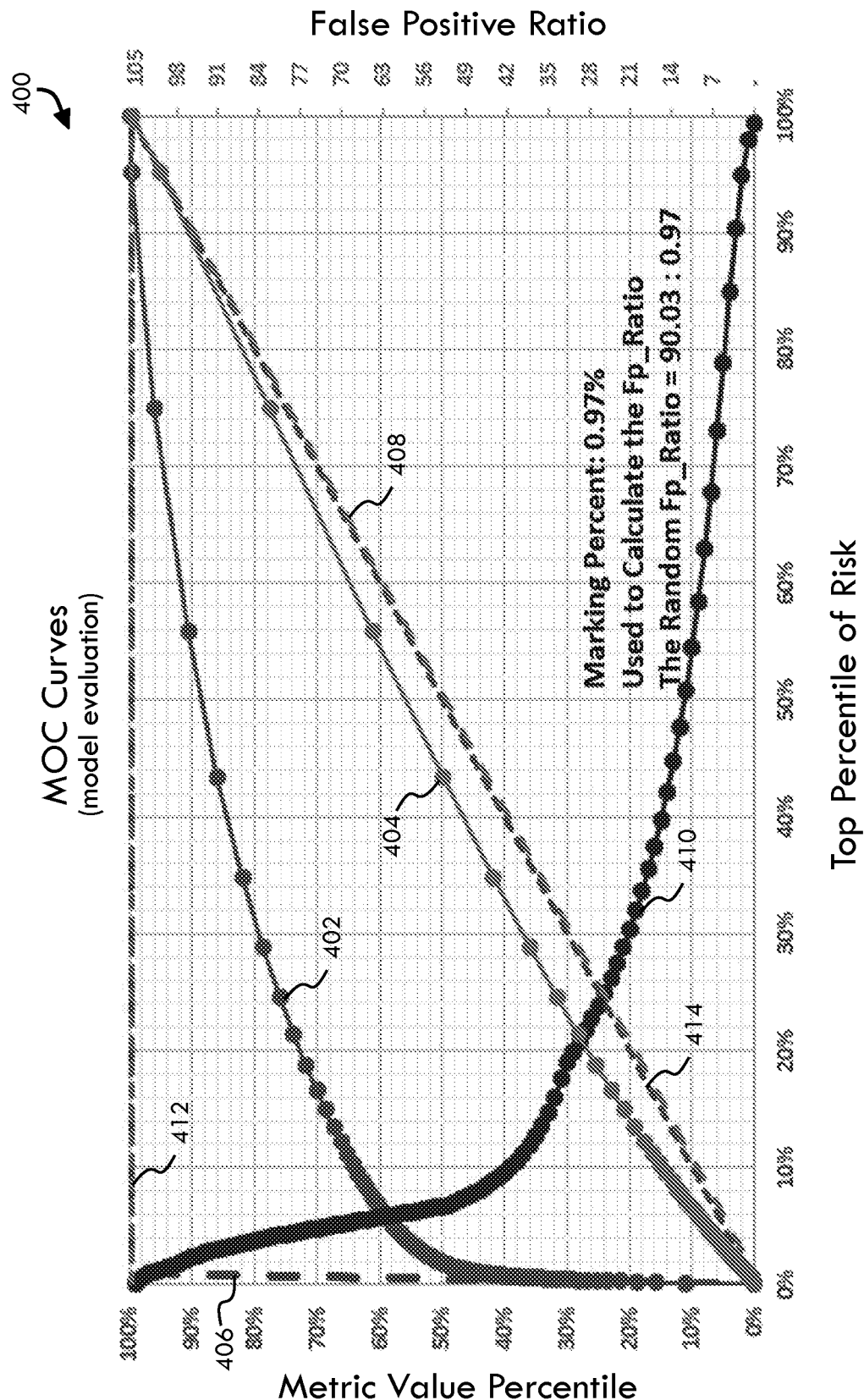
FIG. 4 is a graphical representation of one non-limiting embodiment or aspect of a system and method for optimizing a predictive condition classification model and automatically enacting reactive measures based thereon.

With specific reference to FIG. 4, and in non-limiting embodiments or aspects of the invention, provided is a graphical representation 400 for optimizing a predictive condition classification model and automatically enacting reactive measures based thereon. Depicted are a number of MOC curves plotted together on a same plot. MOC curves for one or more models may be plotted simultaneously. The plot has top percentile of risk (TPR), on the x-axis. The range of TPR spans from 0%, where no data events would be tagged as satisfying condition X, to 100%, where all data events would be tagged as satisfying condition X. Each of the MOC are plotted against TPR. The y-axis is the value in percentage of the given MOC. Any MOC may be given its own y-axis labeling, for example, in FIG. 4, the right-hand y-axis is separately labeled as "False Positive Ratio." However, it will be appreciated that the y-axis is substantively a percentage range for any given MOC. Depicted on the plot is a detect rate (DR) curve 402, which demonstrates the change in detect rate vis-á-vis TPR. At low ranges of TPR, small increases in review rate are likely to greatly increase the DR, and as such, the DR curve 402 climbs quickly. However, in the middle and high ranges of TPR, increases in review rate are less likely to detect additional condition X, and therefore the DR curve 402 tapers off to lesser slope.

With further reference to FIG. 4, and in further non-limiting embodiments or aspects of the invention, depicted is a false positive ratio (FPR) curve 404, which demonstrates the change in false positives vis-à-vis TPR, in the form of false positive ratio percent (FPRP). Although the lowest ranges of TPR are unlikely to encounter false positives, eventually false positives will be introduced as review rate increases. Also depicted is a max detectable rate (Max DR) curve 406. The Max DR curve 406 demonstrates the DR of a perfect decision model. If the review rate is less than the total number of events satisfying condition X in the data set, then the Max DR curve 406 has a linear increasing slope representing one additional detected condition X for every one additional reviewed event. When the review rate equals the total number of events satisfying condition X in the data set, the Max DR curve 406 reaches 100%. Any additional increases in review rate does not increase the DR above 100%, and so the Max DR curve 406 is horizontal for the remaining range of TPR. A decision model that is not perfect will always have a DR curve that is lower than or equal to the Max DR curve 406.

With further reference to FIG. 4, and in further non-limiting embodiments or aspects of the invention, depicted is the minimum false positive ratio (Min FPR) curve 408. The Min FPR curve 408 demonstrates the FPR of a perfect decision model. If the review rate is less than the total number of events satisfying condition X in the data set, then the FPR rate is zero. When the review rate is greater than the total number of events satisfying condition X in the data set, the Min FPR curve 408 increases linearly, to reflect the one false positive for every one additional reviewed event. A decision model that is not perfect will always have a FPR curve that is greater than or equal to the Min FPR curve 408. Also depicted is a score curve 410. As described above, the model score and score TPR can be functionally written to relate to one another, and score may be plotted on the x-axis and TPR may be plotted on the y-axis. Here, the reverse is plotted, with TPR shown on the x-axis and score on the y-axis. In the depicted non-limiting example, the score ranges from 0 to 99, but it may also be represented as a range from 0 to 1, such as a percentage. Therefore, the score may be plotted on the left y-axis in the MOC curve plot.

With further reference to FIG. 4, and in further non-limiting embodiments or aspects of the invention, depicted is a random false positive ratio (RFPR) curve 412. The RFPR curve 412 demonstrates FPR of a zero performance model vis-à-vis TPR. Because a zero performance model performs no better at detecting condition X at 1% TPR than at 99% TPR, the RPFR curve 412 is horizontal. A decision model that is better than zero performance will have a FPR curve that is lower than or equal to the RFPR curve 412. Also depicted is a random detect rate (RDR) curve 414. The RDR curve 414 demonstrates the performance of a zero performance decision model vis-à-vis TPR. Because the model has a random chance of properly identifying an event as satisfying condition X, the RDR curve 414 is linear from 0% to 100%. A decision model that is better than zero performance will have a DR that is greater than or equal to the RDR curve 414. It will be appreciated that any number or variety of MOC curves may be plotted on the same plot. Many configurations are possible.

Figure 5:
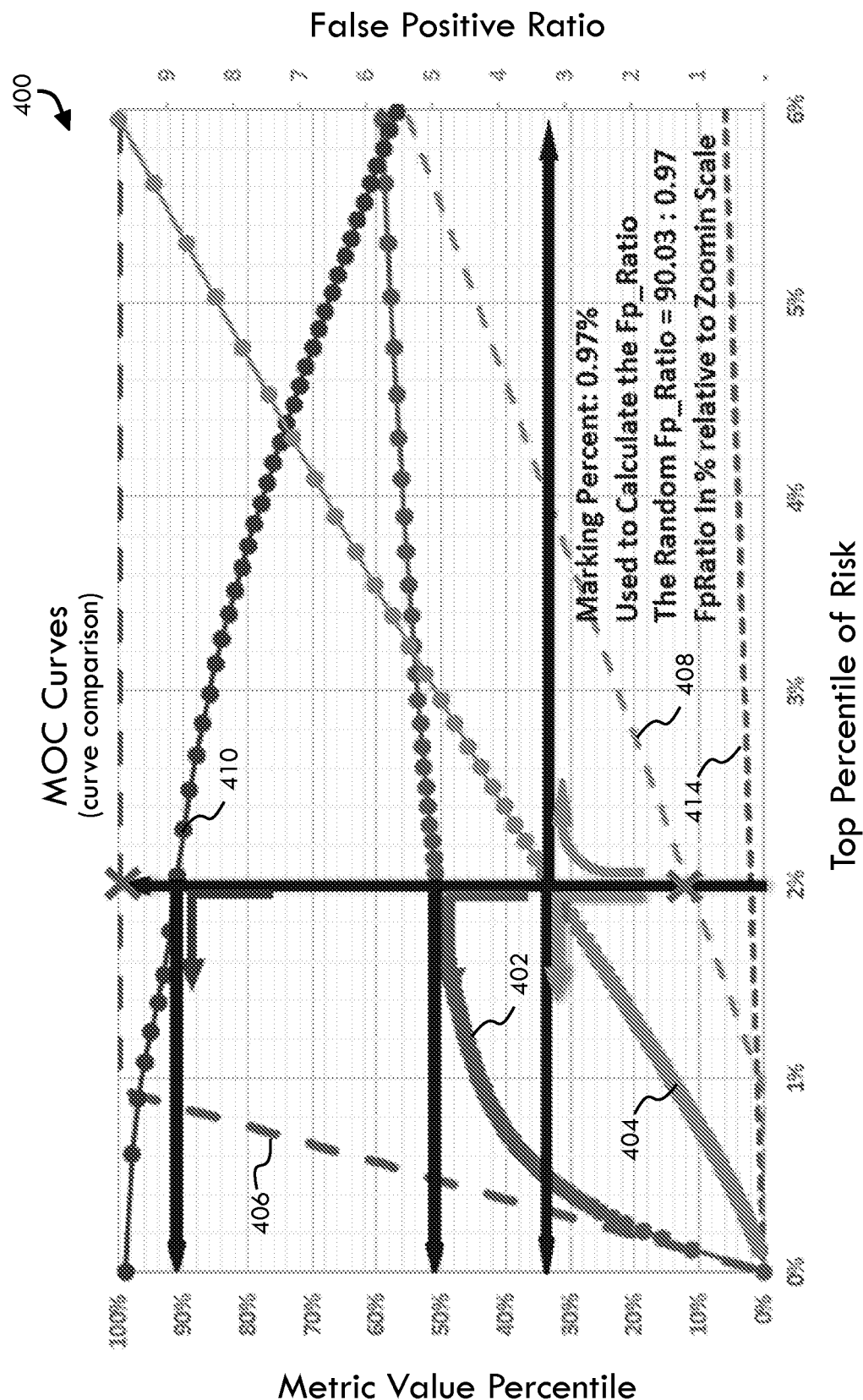
FIG. 5 is a graphical representation of one non-limiting embodiment or aspect of a system and method for optimizing a predictive condition classification model and automatically enacting reactive measures based thereon.

With specific reference to FIG. 5, and in non-limiting embodiments or aspects of the invention, provided is a graphical representation 400 for optimizing a predictive condition classification model and automatically enacting reactive measures based thereon. Depicted is a method of comparing the MOC curves that are presented on the same plot. Because the MOC curves are all plotted vis-à-vis TPR, a model user can glean valuable information by their comparison. In a non-limiting example, there may be 10,000 events to be evaluated, in which 200 events are condition X. The predictive condition classification model will order the events from most likely satisfying condition X to least likely satisfying condition X. Further, the model user may input a top percentile of risk capacity of 2% and tag the top 2% as satisfying condition X. The user can read each MOC value of that given TPR by the respective curve's intersection with a threshold x-axis value, as shown in FIG. 5. In the non-limiting example depiction, a vertical line at 2% TPR intersects with the DR curve 402, the FPR curve 404, the Max DR curve 406, the Min FPR curve 408, the score curve 410, and the RDR curve 414. As such, this visual representation may be displayed to the model user to evaluate the performance of one or more decision models. Additionally, the underlying quantitative comparison can output values to the model user given a quantitative input of TPR or a MOC value. By way of another non-limiting example, the model user may input a threshold FPRP tolerance, which should not be exceed. The FPRP corresponds to a particular TPR, which may be used to identify the corresponding values of MOC at that TPR. The same method may be applied to any input MOC value. It will be appreciated that many configurations are possible.

3. Example Application I: Global Automatic Decision Optimization

Model operational characteristic (MOC) curves are able to return optimized thresholds and corresponding measurements in a configuration for automatic acceptance/rejection, without receiving input thresholds from users. Presented below are two criterions for optimization of decision models for non-input based automated action.

A. MOC Assessment Curve

Recall that the detect rate (DR) is a function of top percentile of risk (TPR), and false positive ratio percent (FPRP) is also a function of TPR. As such, the MOC Assessment Curve (MAC) can be represented as:

$$MAC(tpr)=DR(tpr)-FPRP(tpr) \quad \text{Formula 10}$$

Meanwhile, DR and FPRP can be rewritten as a function of model score (S). As such, the MAC can be represented as a function of S:

$$MAC(s)=DR(s)-FPRP(s) \quad \text{Formula 11}$$

For a binary classification model, this index measures the tradeoff between the detecting power and the false positive ratio. The maximum of the MAC is one numerical summary representing the overall model best performance.

$$\max(MAC(tpr))=\max_{tpr}(DR(tpr)-FPRP(tpr)) \quad \text{Formula 12}$$

$$\max(MAC(s))=\max_{s}(DR(s)-FPRP(s)) \quad \text{Formula 13}$$

The TPR and S that yield the maximum MAC value would be the optimized acceptance/rejection threshold for the decision model. Accordingly, we may define minimum, maximum, and median estimators as follows:

$$TPR_{opt1}=\min_{tpr}\{tpr{:}\max_{tpr}(DR(tpr)-FPRP(tpr))\}$$

$$S_{opt1}=\min_{s}\{s{:}\max_{s}(DR(s)-FPRP(s))\} \quad \text{Formula 14}$$

$$TPR_{opt2}=\max_{tpr}\{tpr{:}\max_{tpr}(DR(tpr)-FPRP(tpr))\}$$

$$S_{opt2}=\max_{s}\{s{:}\max_{s}(DR(s)-FPRP(s))\} \quad \text{Formula 15}$$

$$TPR_{opt3}=\text{median}_{tpr}\{tpr{:}\max_{tpr}(DR(tpr)-FPRP(tpr))\}$$

$$S_{opt3}=\text{median}_{s}\{s{:}\max_{s}(DR(s)-FPRP(s))\} \quad \text{Formula 16}$$

These formula present three different solutions as to the optimal decision model thresholds, if the MAC has multiple global maximums (wherein "global" refers to the entire range of a considered variable, e.g., TPR from 0% to 100%, score from 0 to 100, and/or the like). Each of these threshold possibilities may be presented to a user in an interface for selection and implementation. $TPR_{opt1}$ or $S_{opt1}$ are the thresholds that could reach the maximum of the MAC and yield the smallest false positive ratio. $TPR_{opt3}$ or $S_{opt3}$ are the thresholds that could reach the maximum of the MAC and yield the largest detect rate. At $TPR_{opt3}$ or $S_{opt3}$, the MAC may not reach its maximum value; however, these thresholds provide an implementation between the thresholds of ($TPR_{opt1}$ or $S_{opt1}$) and ($TPR_{opt3}$ or $S_{opt3}$) as an alternative for the users.

Figure 6:
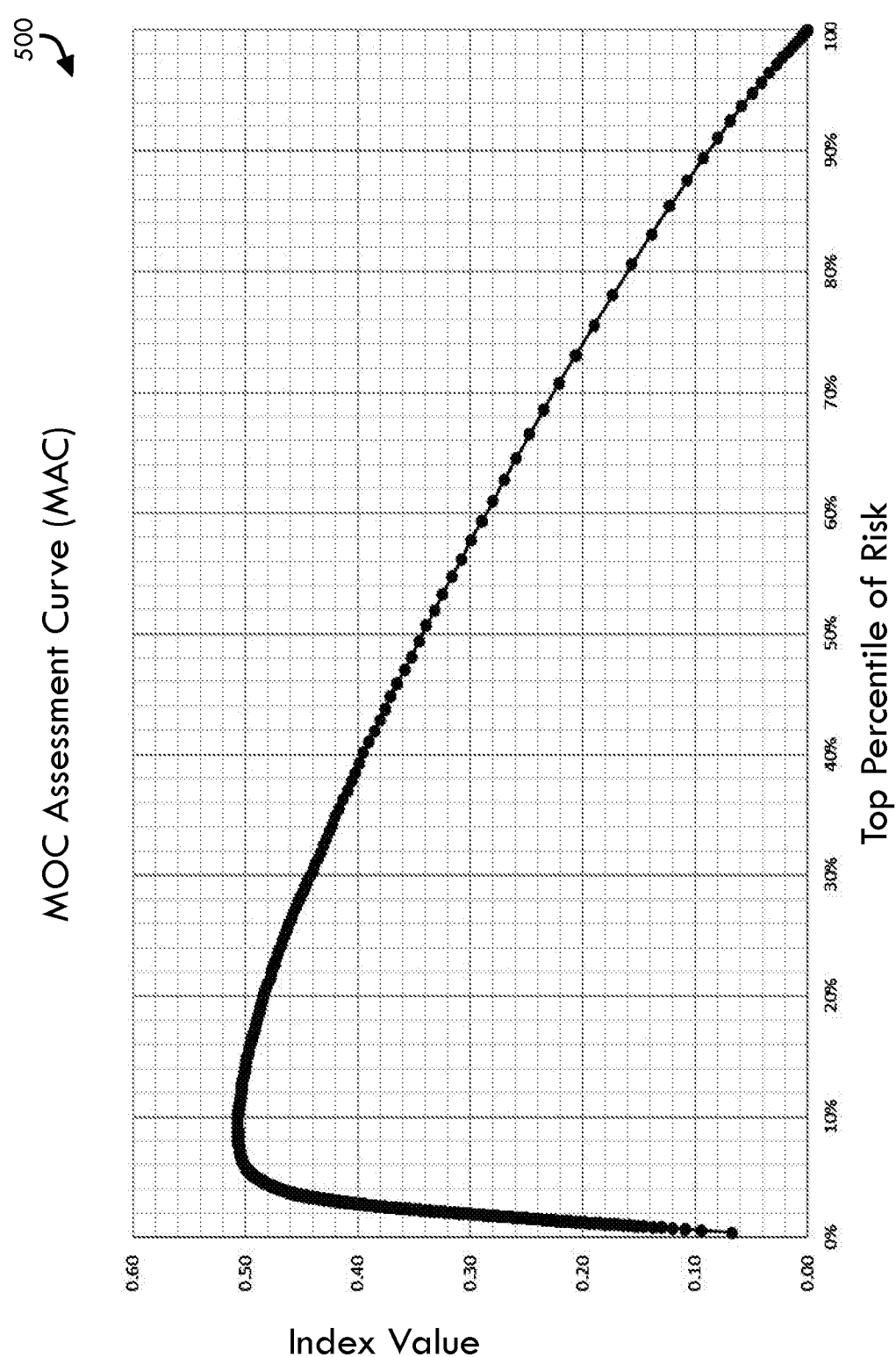
FIG. 6 is a graphical representation of one non-limiting embodiment or aspect of a system and method for optimizing a predictive condition classification model and automatically enacting reactive measures based thereon; and, FIG. 7 is a graphical representation of one non-limiting embodiment or aspect of a system and method for optimizing a predictive condition classification model and automatically enacting reactive measures based thereon.

With specific reference to FIG. 6, and in non-limiting embodiments or aspects of the invention, provided is a graphical representation 500 for optimizing a predictive condition classification model and automatically enacting reactive measures based thereon. Depicted is a non-limiting exemplary plot of the change in the MOC index value as the TPR changes. The MOC Assessment Curve (MAC) present the changes between DR and FPRP. As shown in FIG. 6, the MAC starts low at low TPR values, which may indicate that at a small TPR, the model's capability of detecting fraud may be low. Nonetheless, it may also yield a small false positive ratio. Setting a decision threshold at a small TPR may not be efficiently tagging (e.g., identifying) condition X, however, there would be few incorrectly tagged non-condition X compared to the rate of correctly tagged condition X. As TPR is increased on the MAC, the MAC climbs fast before it reaches its maximum. This pattern reflects the high rising rate of DR, discussed in connection with FIG. 4, and it shows that the increase in DR is faster than that in FPRP. Selecting a decision threshold in this TPR interval demonstrates that the potential gain from correctly tagging condition X exceeds the potential loss from incorrectly tagging non-condition X; therefore, the model user may set a decision threshold in that interval or set the threshold (on TPR) where the MAC reaches its maximum value. As the value of TPR passes the point which maximizes the value of the MAC, the MAC is trending down. This indicates that as TPR further increases, the increase in DR is less than that in FPRP. In other words, if a user desires to tag more condition X in this later interval of TPR, the user would incorrectly tag comparatively more non-condition X. Decision thresholds in this interval are less efficient and accurate.

A user presented with the above optimized decision thresholds may assign weights to DR and FPRP to reflect their opinions on how they value a loss from a false negative (e.g., a fraudulent transaction that is let through) or a false positive classification (e.g., a legitimate transaction that is treated as fraudulent). This leads to the following relationship:

$$MA_g(tpr) = w_1 DR(tpr) - w_2 FPRP(tpr)$$

$$MA_g(s) = w_1 DR(s) - w_2 FPRP(s) \quad \text{Formula 17}$$

where $w_1$ is the weight for DR, $w_2$ is the weight for FPRP, and $w_1 + w_2 = 1$.

B. Sub-ABC Efficiency

A second criterion that may be employed that is the sub area between MOC performance curves (sABC), also known as the "area between curves" (ABC). This may be defined by the following relationship:

$$sABC(x) = \int_0^x [DR(x) - FPRP(x)] dx \quad \text{Formula 18}$$

with respect to TPR. As such, the sABC is the area between the DR and FPRP curve on:

$$TPR \in [0, tpr_0] \quad \text{Formula 19}$$

For any binary classification model, the maximum of sABC is:

$$\max(sABC(x)) = \int_0^x [MAXDR(x) - MINFPRP(x)] dx$$

with respect to the TPR. The maximum of sABC is the value indicating the maximum performance of a given decision threshold of TPR. Therefore, the following relationship of the deaccessioning point may be derived:

$$sAE(x) = sABC(x)/\max(sABC(x)) \quad \text{Formula 20}$$

where sAE is the sub area between the MOC performance curves efficiency. For a classification model with reasonable performances, the sAE value tends to be large when the TPR is small, and it decreases as TPR increases. After reaching a certain point, sAE increases as TPR increases, thus, the deaccessioning point.

The deaccessioning point of the sAE is helpful to determine certain model optimizations. Consider the non-limiting embodiment of fraudulent transaction detection. When setting TPR to be a small value for rejection, the model performs well on differentiating fraudulent and legitimate transactions. In other words, in the rejection zone, the false positive ratio is small, and the model performing curves are very close to the perfect performing curves; therefore, the sAE value is large. However, it normally is the case that the fraud detection rate has not yet reached a desired level yet, since the TPR ceiling is small. A more desirable threshold would have a larger TPR for a larger rejection region, trading off detection rate and false positive ratio (though this means sAE value will decrease). Therefore, it is the goal to find a global optimal decision point in regard to tradeoff between detection rate and false positive ratio with regard to sAE. In this case, the optimal point is when the decrease in sAE with subsequent tradeoffs slows down or turns around (roughly the deaccessioning point).

Therefore, an optimal threshold may be represented by the following relationship:

$$TPR_{sol} \in \left\{ x \,\middle|\, \frac{\partial^2 sAE(x)}{\partial^2 x} = 0, \text{ and } \frac{\partial sAE(x)}{\partial x} < 0 \right\} \quad \text{Formula 21}$$

where optimal thresholds may be represented by the following choices:

$$TPR_{opt1} = \min(TPR_{sol}) \quad \text{Formula 22}$$

$$TPR_{opt2} = \max(TPR_{sol}) \quad \text{Formula 23}$$

$$TPR_{opt3} = \text{median}(TPR_{sol}) \quad \text{Formula 24}$$

Figure 7:
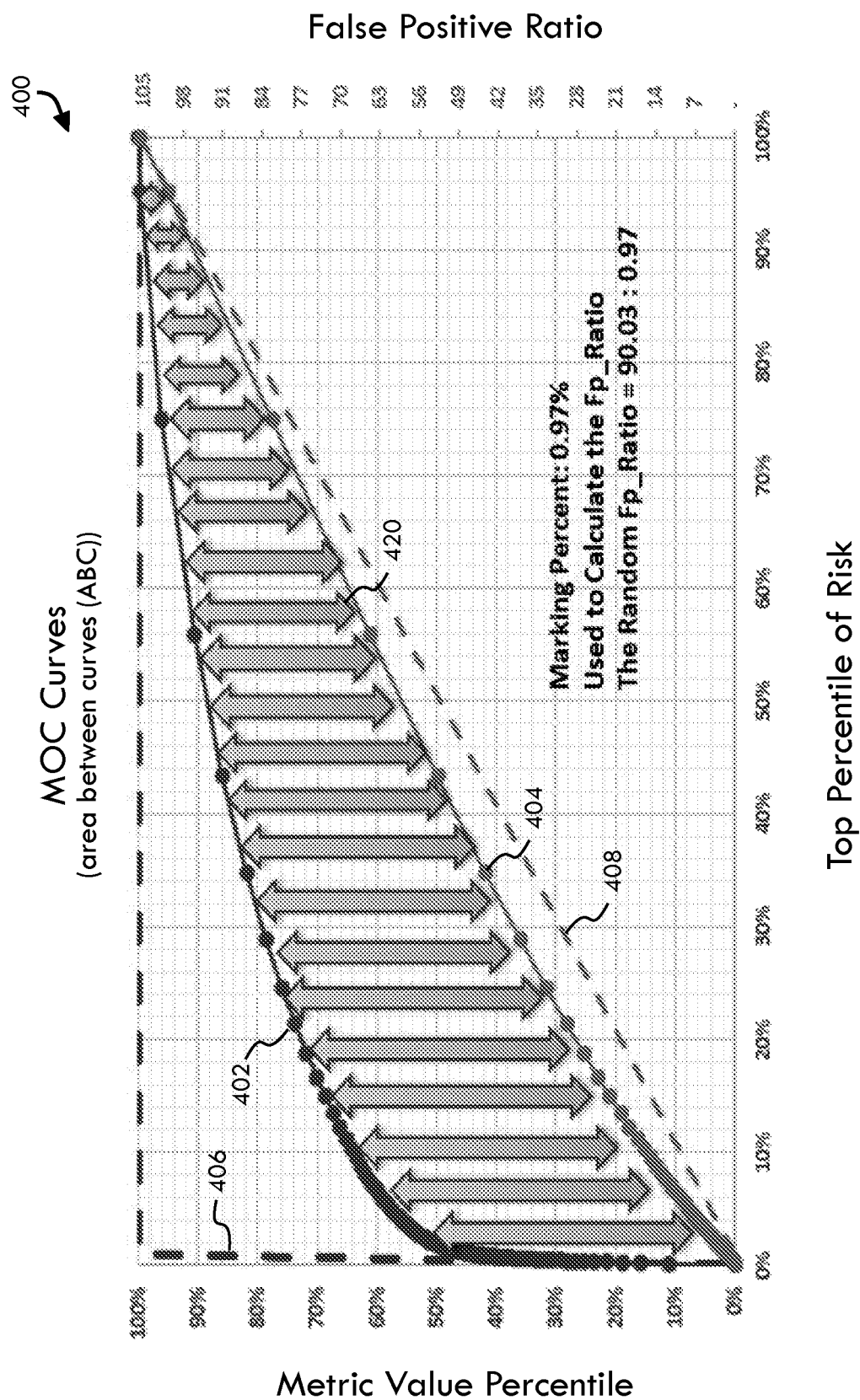

With specific reference to FIG. 7, and in non-limiting embodiments or aspects of the invention, provided is a graphical representation 400 for optimizing a predictive condition classification model and automatically enacting reactive measures based thereon. Depicted is the area between curves (ABC) for the DR curve 402 relative to the FPR curve 404. This plot may be presented to a model user, and/or the quantitative equivalents may be output to the user based on the input thresholds, capacities, and/or tolerances.

4. Example Application II: Segmentation Automatic Decision Optimization

In an alternative, non-limiting embodiment, a user may input one or more desired/present decision tolerances, capacities, and/or thresholds based on one or more model performance metrics, such that the MOC mechanism may return corresponding model performance indicators to help the user understand the impact of their set thresholds. These may include, but are not limited to, detect rate requirement, false positive ratio tolerance, rejection rate tolerance, review rate capacity, and/or the like. Given an input of one of these parameters, the optimization model may execute a direct query of the value of the other parameters and output those values to the model user, along with resulting review rate. Moreover, the model user may be presented with the optimized threshold for the given input parameter. In a non-limiting alternative, the tolerances, capacities, and/or thresholds may be input as ranges rather than values. In such a case, the corresponding ranges of the other parameters may be output, along with the resulting ranges of review rate. In this manner, the model user may finesse the TPR of a given decision model to achieve MOC satisfying the value or range of the target parameter.

With further reference to the foregoing, dollar values may be corresponded to one or more MOC, such that a model user may input or receive output in terms of dollar values. For example, the dollar value of a false positive may be input or determined from historical data. The model user may specify that they do not want to expend more than a threshold amount for encountering false positives. As such, the model evaluation server may convert MOC values to dollar values and limit the TPR to expending no more than the threshold amount for false positives. It will be appreciated that many configurations and alternatives are possible.

Although the invention has been described in detail for the purpose of illustration based on what is currently considered to be the most practical and preferred and non-limiting embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for optimizing a predictive fraud detection model and automatically enacting reactive measures based thereon, the method comprising:

receiving, with at least one processor, transaction data representative of a plurality of transaction requests between at least one financial device holder and at least one merchant in a first time period, the transaction data comprising for each transaction request of the plurality of transaction requests at least one of the following parameters: transaction date, transaction time, transaction value, merchant type, transaction type, merchant location, or any combination thereof;

receiving, with at least one processor from a user interface, an identification of the predictive fraud detection model to be evaluated;

in response to receiving the identification, receiving, with at least one processor, the predictive fraud detection model to be evaluated, the predictive fraud detection model configured to categorize each transaction request as fraudulent or legitimate based at least partially on the parameters of the transaction request, the predictive fraud detection model further configured to order the plurality of transaction requests, relative to each other transaction request, from most likely fraudulent to least likely fraudulent;

generating, with at least one processor, a performance evaluation dataset comprising an output of the predictive fraud detection model given an input of the transaction data;

generating, with at least one processor, plotting data configured to cause a visual display of the user interface to represent at least two model performance metrics of the performance evaluation dataset on a same output plot, the same output plot having an x-axis of percentile threshold for transaction rejection and a y-axis of percent of metric value of the at least two model performance metrics, the at least two model performance metrics calculated from the performance evaluation dataset, and the at least two model performance metrics being a false positive ratio and at least one of the following: detection rate, maximum detectable rate, minimum false positive ratio, model performance score, random model false positive ratio, random model detection rate, or any combination thereof;

transmitting, with at least one processor, the plotting data to the user interface, wherein the plotting data is further configured to, in response to input in the user interface comprising a specification of a quantitative value of percentile threshold for transaction rejection, generate a corresponding metric value of each of the at least two model performance metrics in the same output plot;

receiving, with at least one processor from the user interface, a user input comprising the specification of the quantitative value of percentile threshold for transaction rejection; and in response to receiving the user input, automatically rejecting, with at least one processor, a top percent of the plurality of transaction requests for suspected fraudulent transaction activity, the top percent determined at least partially from a customized rejection algorithm based on the user input.

2. The computer-implemented method of claim 1, the method further comprising, in response to receiving a metric input in the user interface of a first value of a first selected model performance metric, generating and displaying, with at least one processor, a corresponding value of a second selected model performance metric, wherein the plotting data is further configured to cause the visual display to represent all of the following model performance metrics on the same output plot: detection rate, false positive ratio, maximum detectable rate, minimum false positive ratio, model performance score, random model false positive ratio, and random model detection rate.

3. The computer-implemented method of claim 1, further comprising:

receiving, with at least one processor, an extrinsic evaluation of a legitimacy of each transaction request of the top percent of the plurality of transaction requests, the extrinsic evaluation comprising a true positive rate and a false positive rate of the performance evaluation dataset;

adjusting, with at least one processor, the predictive fraud detection model based on the extrinsic evaluation;

receiving, with at least one processor, a second set of transaction data representative of a plurality of new transaction requests between at least one financial device holder and at least one merchant in a second time period;

re-generating, with at least one processor, the performance evaluation dataset;

re-generating, with at least one processor, the plotting data; and, automatically rejecting, with at least one processor and based on the adjusted predictive fraud detection model, a top percent of the plurality of new transaction requests for suspected fraudulent transaction activity.

4. The computer-implemented method of claim 1, further comprising receiving, with at least one processor, at least one additional predictive fraud detection model to be evaluated; wherein:

the performance evaluation dataset further comprises an output of the at least one additional predictive fraud detection model to be evaluated; and, the plotting data is further configured to cause the visual display to represent the predictive fraud detection model comparatively to the at least one additional predictive fraud detection model.

5. The computer-implemented method of claim 4, further comprising:

receiving, with at least one processor, a selected model from the user interface, the selected model chosen from a set comprising the predictive fraud detection model and the at least one additional predictive fraud detection model, wherein the automatic rejection of the top percent of the plurality of transaction requests is based on the selected model, which is configured to order the plurality of transaction requests from most likely fraudulent to least likely fraudulent.

6. The computer-implemented method of claim 4, wherein the user input further comprises an optimization input comprising at least one of the following parameters: detect rate requirement; false positive ratio tolerance; rejection rate tolerance; review rate capacity; or any combination thereof; and wherein the top percent is further determined from the optimization input.

7. The computer-implemented method of claim 1, wherein the user input further comprises an input cost tolerance, and wherein the customized rejection algorithm is further based on an optimization input determined from the input cost tolerance and an associated cost incurred per rejected transaction request.

8. A system for optimizing a predictive fraud detection model and automatically enacting reactive measures based thereon, the system comprising at least one server computer including at least one processor, the at least one server computer programmed and/or configured to:

receive transaction data representative of a plurality of transaction requests between at least one financial device holder and at least one merchant in a first time period, the transaction data comprising for each transaction request of the plurality of transaction requests at least one of the following parameters: transaction date, transaction time, transaction value, merchant type, transaction type, merchant location, or any combination thereof;

receive, from a user interface, an identification of the predictive fraud detection model to be evaluated;

in response to receiving the identification, receive the predictive fraud detection model to be evaluated, the predictive fraud detection model configured to categorize each transaction request as fraudulent or legitimate based at least partially on the parameters of the transaction request, the predictive fraud detection model further configured to order the plurality of transaction requests, relative to each other transaction request, from most likely fraudulent to least likely fraudulent;

generate a performance evaluation dataset comprising an output of the predictive fraud detection model given an input of the transaction data;

generate plotting data configured to cause a visual display of the user interface to represent at least two model performance metrics of the performance evaluation dataset on a same output plot, the same output plot having an x-axis of percentile threshold for transaction rejection and a y-axis of percent of metric value of the at least two model performance metrics, the at least two model performance metrics calculated from the performance evaluation dataset, and the at least two model performance metrics being a false positive ratio and at least one of the following: detection rate, maximum detectable rate, minimum false positive ratio, model performance score, random model false positive ratio, random model detection rate, or any combination thereof;

transmit the plotting data to the user interface, wherein the plotting data is further configured to, in response to input in the user interface comprising a specification of a quantitative value of percentile threshold for transaction rejection, generate a corresponding metric value of each of the at least two model performance metrics in the same output plot;

receive a user input comprising the specification of the quantitative value of percentile threshold for transaction rejection; and in response to receiving the user input, automatically reject a top percent of the plurality of transaction requests for suspected fraudulent transaction activity, the top percent determined at least partially from a customized rejection algorithm based on the user input.

9. The system of claim 8, the at least one server computer further programmed and/or configured to, in response to receiving a metric input in the user interface of a first value of a first selected model performance metric, generate and display a corresponding value of a second selected model performance metric, wherein the plotting data is further configured to cause the visual display to represent all of the following model performance metrics on the same output plot: detection rate, false positive ratio, maximum detectable rate, minimum false positive ratio, model performance score, random model false positive ratio, and random model detection rate.

10. The system of claim 8, the at least one server computer further programmed and/or configured to:

receive an extrinsic evaluation of a legitimacy of each transaction request of the top percent of the plurality of transaction requests, the extrinsic evaluation comprising a true positive rate and a false positive rate of the performance evaluation dataset;

adjust the predictive fraud detection model based on the extrinsic evaluation;

receive a second set of transaction data representative of a plurality of new transaction requests between at least one financial device holder and at least one merchant in a second time period;

re-generate the performance evaluation dataset;

re-generate the plotting data; and, automatically reject, based on the adjusted predictive fraud detection model, a top percent of the plurality of new transaction requests for suspected fraudulent transaction activity.

11. The system of claim 8, the at least one server computer further programmed and/or configured to receive at least one additional predictive fraud detection model to be evaluated; wherein:

the performance evaluation dataset further comprises an output of the at least one additional predictive fraud detection model to be evaluated; and, the plotting data is further configured to cause the visual display to represent the predictive fraud detection model comparatively to the at least one additional predictive fraud detection model.

12. The system of claim 11, the at least one server computer further programmed and/or configured to:

receive a selected model from the user interface, the selected model chosen from a set comprising the predictive fraud detection model and the at least one additional predictive fraud detection model, wherein the automatic rejection of the top percent of the plurality of transaction requests is based on the selected model, which is configured to order the plurality of transaction requests from most likely fraudulent to least likely fraudulent.

13. The system of claim 11, wherein the user input further comprises an optimization input comprising at least one of the following parameters: detect rate requirement; false positive ratio tolerance; rejection rate tolerance; review rate capacity; or any combination thereof; and wherein the top percent is further determined from the optimization input.

14. The system of claim 8, wherein the user input further comprises an input cost tolerance, and wherein the customized rejection algorithm is further based on an optimization input determined from the input cost tolerance and an associated cost incurred per rejected transaction request.

15. A computer program product for optimizing a predictive fraud detection model and automatically enacting reactive measures based thereon, the computer program product comprising at least one non-transitory computer-readable medium including program instructions that, when executed by at least one processor, cause the at least one processor to:

receive transaction data representative of a plurality of transaction requests between at least one financial device holder and at least one merchant in a first time period, the transaction data comprising for each transaction request of the plurality of transaction requests at least one of the following parameters: transaction date, transaction time, transaction value, merchant type, transaction type, merchant location, or any combination thereof;

receive, from a user interface, an identification of the predictive fraud detection model to be evaluated;

in response to receiving the identification, receive the predictive fraud detection model to be evaluated, the predictive fraud detection model configured to categorize each transaction request as fraudulent or legitimate based at least partially on the parameters of the transaction request, the predictive fraud detection model further configured to order the plurality of transaction requests, relative to each other transaction request, from most likely fraudulent to least likely fraudulent;

generate a performance evaluation dataset comprising an output of the predictive fraud detection model given an input of the transaction data;

generate plotting data configured to cause a visual display of the user interface to represent at least two model performance metrics of the performance evaluation dataset on a same output plot, the same output plot having an x-axis of percentile threshold for transaction rejection and a y-axis of percent of metric value of the at least two model performance metrics, the at least two model performance metrics calculated from the performance evaluation dataset, and the at least two model performance metrics being a false positive ratio and at least one of the following: detection rate, maximum detectable rate, minimum false positive ratio, model performance score, random model false positive ratio, random model detection rate, or any combination thereof; transmit the plotting data to the user interface, wherein the plotting data is further configured to, in response to input in the user interface comprising a specification of a quantitative value of percentile threshold for transaction rejection, generate a corresponding metric value of each of the at least two model performance metrics in the same output plot;

receive a user input comprising the specification of the quantitative value of percentile threshold for transaction rejection; and in response to receiving the user input, automatically reject a top percent of the plurality of transaction requests for suspected fraudulent transaction activity, the top percent determined at least partially from a customized rejection algorithm based on the user input.

16. The computer program product of claim 15, wherein the program instructions further cause the at least one processor to, in response to receiving a metric input in the user interface of a first value of a first selected model performance metric, generate and display a corresponding value of a second selected model performance metric, wherein the plotting data is further configured to cause the visual display to represent all of the following model performance metrics on the same output plot: detection rate, false positive ratio, maximum detectable rate, minimum false positive ratio, model performance score, random model false positive ratio, and random model detection rate.

17. The computer program product of claim 15, wherein the program instructions further cause the at least one processor to:
receive an extrinsic evaluation of a legitimacy of each transaction request of the top percent of the plurality of transaction requests, the extrinsic evaluation comprising a true positive rate and a false positive rate of the performance evaluation dataset;
adjust the predictive fraud detection model based on the extrinsic evaluation;
receive a second set of transaction data representative of a plurality of new transaction requests between at least one financial device holder and at least one merchant in a second time period;
re-generate the performance evaluation dataset;
re-generate the plotting data; and,
automatically reject, based on the adjusted predictive fraud detection model, a top percent of the plurality of new transaction requests for suspected fraudulent transaction activity.

18. The computer program product of claim 15, wherein the program instructions further cause the at least one processor to receive at least one additional predictive fraud detection model to be evaluated; wherein:
the performance evaluation dataset further comprises an output of the at least one additional predictive fraud detection model to be evaluated; and,
the plotting data is further configured to cause the visual display to represent the predictive fraud detection model comparatively to the at least one additional predictive fraud detection model.

19. The computer program product of claim 18, wherein the program instructions further cause the at least one processor to:
receive a selected model from the user interface, the selected model chosen from a set comprising the predictive fraud detection model and the at least one additional predictive fraud detection model,
wherein the automatic rejection of the top percent of the plurality of transaction requests is based on the selected model, which is configured to order the plurality of transaction requests from most likely fraudulent to least likely fraudulent.

20. The computer program product of claim 18, wherein the user input further comprises an optimization input comprising at least one of the following parameters: detect rate requirement; false positive ratio tolerance; rejection rate tolerance; review rate capacity; or any combination thereof; and wherein the top percent is further determined from the optimization input.

21. The computer program product of claim 15, wherein the user input further comprises an input cost tolerance, and wherein the customized rejection algorithm is further based on an optimization input determined from the input cost tolerance and an associated cost incurred per rejected transaction request.

* * * * *